(12) United States Patent
Hobbs et al.

(10) Patent No.: US 12,392,119 B2
(45) Date of Patent: *Aug. 19, 2025

(54) PLUMBING COMPONENT

(71) Applicant: KOHLER MIRA LIMITED, Cheltenham (GB)

(72) Inventors: Barry Steven Hobbs, Cheltenham (GB); Mark Frederick Florencio Barton, Cheltenham (GB); Philip Peter Ineson, Cheltenham (GB); Alexander Colin Fagg, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 458 days.

This patent is subject to a terminal disclaimer.

(21) Appl. No.: 17/840,905

(22) Filed: Jun. 15, 2022

(65) Prior Publication Data

US 2022/0307243 A1    Sep. 29, 2022

Related U.S. Application Data

(63) Continuation of application No. 16/867,232, filed on May 5, 2020, now Pat. No. 11,391,021, which is a
(Continued)

(30) Foreign Application Priority Data

Nov. 9, 2017 (GB) ...................... 1718562

(51) Int. Cl.
*E03C 1/02* (2006.01)
*E03C 1/04* (2006.01)
(Continued)

(52) U.S. Cl.
CPC ............. *E03C 1/023* (2013.01); *E03C 1/04* (2013.01); *F16K 1/44* (2013.01); *F16K 1/54* (2013.01); *F16K 11/22* (2013.01)

(58) Field of Classification Search
CPC ... E03C 1/023; E03C 1/04; F16K 1/44; F16K 1/52; F16K 1/54; F16K 11/22; F16K 3/32; F16K 3/34
See application file for complete search history.

(56) References Cited

U.S. PATENT DOCUMENTS

| 106,561 A | 8/1870 | Dill |
|---|---|---|
| 1,065,615 A | 6/1913 | Lawler |
| (Continued) | | |

FOREIGN PATENT DOCUMENTS

| AU | 2013101137 A4 | 10/2013 |
|---|---|---|
| CA | 2637121 A1 | 1/2010 |
| (Continued) | | |

OTHER PUBLICATIONS

Great Britain Combined Search Report and Examination Report on Appl. Ser. No. GB 1211101.9 dated Aug. 21, 2012 (9 pages).
(Continued)

*Primary Examiner* — Michael R Reid
(74) *Attorney, Agent, or Firm* — Husch Blackwell LLP

(57) ABSTRACT

A plumbing component includes a cold water inlet; a hot water inlet; an outlet configured to output cold water, hot water, or a mixture thereof; a flow shut-off mechanism for restricting the flow of water out of the outlet; a first flow control valve for controlling the flow of cold water; and a second flow control valve for controlling the flow of hot water. Each of the flow control valves comprises a valve member and an associated valve seat, each valve member arranged to engage with the associated valve seat to control the flow of water through the flow control valves to the water outlet. One or both of the valve members includes a graduated flow control bead arranged to seal against the associated
(Continued)

valve seat to provide a graduated flow transition between a maximum flow state and a minimum flow state of the, or each, control valve.

20 Claims, 10 Drawing Sheets

Related U.S. Application Data continuation of application No. PCT/GB2018/053122, filed on Oct. 29, 2018.

(51) Int. Cl.
*F16K 1/44* (2006.01)
*F16K 1/54* (2006.01)
*F16K 11/22* (2006.01)

(56) References Cited

U.S. PATENT DOCUMENTS

| | | |
|---|---|---|
| 1,258,262 A | 3/1918 | Shapley |
| 1,291,939 A | 1/1919 | Laubach |
| 1,434,945 A | 11/1922 | Cooper |
| 1,476,718 A | 12/1923 | Leonard |
| 1,479,546 A | 1/1924 | Johnson |
| 1,500,820 A | 7/1924 | Jones |
| 1,740,156 A | 12/1929 | Crane et al. |
| 1,747,640 A | 2/1930 | Morris |
| 1,923,711 A | 8/1933 | Decker |
| 1,948,971 A | 2/1934 | Meyer |
| 2,044,634 A | 6/1936 | Rieder |
| 2,117,044 A | 5/1938 | Paulsen |
| 2,146,930 A | 2/1939 | Bassett, Jr. |
| 2,262,290 A | 11/1941 | Kuhnle |
| 2,340,489 A | 2/1944 | Pontius et al. |
| 2,393,442 A | 1/1946 | Yellott et al. |
| 2,399,460 A | 4/1946 | Britton |
| 2,427,124 A | 9/1947 | Dawson |
| 2,449,766 A | 9/1948 | Brown |
| 2,452,367 A | 10/1948 | Gangloff |
| 2,499,496 A | 3/1950 | Grimes et al. |
| 2,508,074 A | 5/1950 | Miller et al. |
| 2,591,991 A | 4/1952 | Young |
| 2,698,029 A | 12/1954 | Branson |
| 2,731,036 A | 1/1956 | Hughes |
| 2,737,979 A | 3/1956 | Parker |
| 2,791,238 A | 5/1957 | Bryant |
| 2,935,079 A | 5/1960 | Shelton |
| 3,012,583 A | 12/1961 | Gorgens et al. |
| 3,034,138 A | 5/1962 | Filliung |
| 3,087,675 A | 4/1963 | Honegger |
| 3,094,139 A | 6/1963 | Budde et al. |
| 3,103,231 A | 9/1963 | Moen |
| 3,116,748 A | 1/1964 | Wasson |
| 3,150,687 A | 9/1964 | Kalle |
| 3,152,612 A | 10/1964 | Avery |
| 3,206,159 A | 9/1965 | Anderson et al. |
| 3,319,893 A | 5/1967 | Rodgers |
| 3,322,342 A | 5/1967 | Veale |
| 3,327,729 A | 6/1967 | Erickson |
| 3,342,203 A | 9/1967 | Abercrombie |
| 3,385,320 A | 5/1968 | Fahie |
| 3,475,392 A | 10/1969 | Mccoy et al. |
| 3,561,481 A | 2/1971 | Taplin |
| 3,561,482 A | 2/1971 | Taplin |
| 3,575,208 A | 4/1971 | Urban |
| 3,584,784 A | 6/1971 | Burhop |
| 3,587,156 A | 6/1971 | Sorenson |
| 3,633,617 A | 1/1972 | Stacey |
| 3,651,523 A | 3/1972 | Miyahara et al. |
| 3,696,836 A | 10/1972 | Bauer |
| 3,706,872 A | 12/1972 | Trabilcy |
| 3,711,028 A | 1/1973 | Hengesbach |
| 3,758,002 A | 9/1973 | Doyle et al. |
| 3,762,443 A | 10/1973 | Sorenson |
| 3,768,513 A | 10/1973 | Sauret |
| 3,784,785 A | 1/1974 | Noland |
| 3,799,447 A | 3/1974 | Beal |
| 3,834,416 A | 9/1974 | Parkison |
| 3,896,836 A | 7/1975 | Labarre |
| 3,915,193 A | 10/1975 | Rutt |
| 3,938,556 A | 2/1976 | Hicks |
| 3,990,477 A | 11/1976 | Johnson |
| 3,998,240 A | 12/1976 | Liautaud |
| 4,074,697 A | 2/1978 | Saether |
| 4,074,967 A | 2/1978 | Fuchs et al. |
| 4,084,271 A | 4/1978 | Ginsberg |
| 4,175,706 A | 11/1979 | Gerstmann |
| 4,177,970 A | 12/1979 | Ring, Jr. |
| 4,220,175 A | 9/1980 | Fox et al. |
| 4,222,410 A | 9/1980 | Geimer |
| 4,253,482 A | 3/1981 | Stephens |
| 4,313,469 A | 2/1982 | Johnson |
| 4,314,585 A | 2/1982 | Nishimiya et al. |
| 4,324,267 A | 4/1982 | Bach |
| 4,407,711 A | 10/1983 | Baboian et al. |
| 4,420,811 A | 12/1983 | Tarnay et al. |
| 4,422,470 A | 12/1983 | Jackson et al. |
| 4,444,357 A | 4/1984 | Lynch et al. |
| 4,448,211 A | 5/1984 | Yoshida |
| 4,541,562 A | 9/1985 | Zukausky |
| 4,558,206 A | 12/1985 | Ball |
| 4,611,626 A | 9/1986 | Logsdon |
| 4,618,091 A | 10/1986 | Buzzi |
| 4,696,428 A | 9/1987 | Shakalis |
| 4,711,392 A | 12/1987 | Kidouchi et al. |
| 4,735,357 A | 4/1988 | Gregory et al. |
| 4,738,393 A | 4/1988 | Bergmann et al. |
| 4,739,798 A | 4/1988 | Botnick |
| 4,740,511 A | 4/1988 | Blythin |
| 4,745,011 A | 5/1988 | Fukuta et al. |
| 4,762,273 A | 8/1988 | Gregory et al. |
| 4,765,845 A | 8/1988 | Takada et al. |
| 4,785,845 A | 11/1988 | Kochal |
| 4,863,098 A | 9/1989 | Kolze et al. |
| 4,867,375 A | 9/1989 | Kouichi et al. |
| 4,873,830 A | 10/1989 | Ernst |
| 4,886,207 A | 12/1989 | Lee et al. |
| 4,894,520 A | 1/1990 | Moran |
| 4,895,126 A | 1/1990 | Nishimiya et al. |
| 4,909,435 A | 3/1990 | Kidouchi et al. |
| 4,928,494 A | 5/1990 | Glamm |
| 4,944,049 A | 7/1990 | Leonard |
| 4,953,236 A | 9/1990 | Lee et al. |
| 4,955,535 A | 9/1990 | Tsutsui et al. |
| 4,967,794 A | 11/1990 | Tsutsui et al. |
| 4,971,106 A | 11/1990 | Tsutsui et al. |
| 4,978,058 A | 12/1990 | Duncan et al. |
| 4,986,085 A | 1/1991 | Tischer |
| 5,011,112 A | 4/1991 | Glamm |
| 5,033,671 A | 7/1991 | Shiba et al. |
| 5,050,062 A | 9/1991 | Hass |
| 5,058,804 A | 10/1991 | Yonekubo et al. |
| 5,069,186 A | 12/1991 | Mario |
| 5,070,552 A | 12/1991 | Gentry et al. |
| 5,083,745 A | 1/1992 | Tischer |
| 5,085,399 A | 2/1992 | Tsutsui et al. |
| 5,090,895 A | 2/1992 | Jensen et al. |
| 5,093,943 A | 3/1992 | Wei |
| 5,123,445 A | 6/1992 | Chung-Shan |
| 5,152,465 A | 10/1992 | Calabro |
| 5,172,713 A | 12/1992 | Hall |
| 5,199,790 A | 4/1993 | Pawelzik et al. |
| 5,206,963 A | 5/1993 | Wiens |
| 5,234,020 A | 8/1993 | Orlandi |
| 5,313,985 A | 5/1994 | Donner |
| 5,351,892 A | 10/1994 | Conte |
| 5,353,448 A | 10/1994 | Lee |
| 5,358,177 A | 10/1994 | Cashmore |
| 5,390,855 A | 2/1995 | Mims et al. |
| 5,417,083 A | 5/1995 | Eber |
| 5,504,950 A | 4/1996 | Natalizia et al. |
| 5,524,668 A | 6/1996 | Matsuo et al. |

(56) References Cited

U.S. PATENT DOCUMENTS

| | | |
|---|---|---|
| 5,647,531 A | 7/1997 | Kline et al. |
| 5,718,378 A | 2/1998 | Dupre |
| 5,730,167 A | 3/1998 | Enoki et al. |
| 5,823,441 A | 10/1998 | Nicholson |
| 5,837,970 A | 11/1998 | Jilek |
| 5,853,130 A | 12/1998 | Ellsworth |
| 5,855,356 A | 1/1999 | Fait |
| 5,870,302 A | 2/1999 | Oliver |
| 5,870,305 A | 2/1999 | Yokoyama |
| 5,873,518 A | 2/1999 | Richmond et al. |
| 5,975,119 A | 11/1999 | Silva et al. |
| 5,979,775 A | 11/1999 | Raya |
| 5,979,776 A | 11/1999 | Williams |
| 5,993,117 A | 11/1999 | Lancaster et al. |
| 6,029,094 A | 2/2000 | Diffut |
| 6,056,823 A | 5/2000 | Sajoto et al. |
| 6,070,615 A | 6/2000 | Chen |
| 6,145,538 A | 11/2000 | Park |
| 6,157,103 A | 12/2000 | Ohta et al. |
| 6,219,859 B1 | 4/2001 | Derakhshan |
| 6,237,853 B1 | 5/2001 | Bergmann |
| 6,286,550 B1 | 9/2001 | Yamaki et al. |
| 6,286,764 B1 | 9/2001 | Garvey et al. |
| 6,317,717 B1 | 11/2001 | Lindsey et al. |
| 6,438,770 B1 | 8/2002 | Hed et al. |
| 6,442,775 B1 | 9/2002 | Neumann et al. |
| 6,446,875 B1 | 9/2002 | Brooks et al. |
| 6,473,917 B1 | 11/2002 | Mateina |
| 6,536,458 B1 | 3/2003 | Kindermann |
| 6,643,862 B2 | 11/2003 | Aitken |
| 6,659,372 B2 | 12/2003 | Marsh et al. |
| 6,668,854 B2 | 12/2003 | Fukuda |
| 6,688,332 B2 | 2/2004 | Liesenhoff |
| 6,705,534 B1 | 3/2004 | Mueller |
| 6,708,721 B2 | 3/2004 | Fukuda et al. |
| 6,722,575 B1 | 4/2004 | Gagne et al. |
| 6,748,969 B2 | 6/2004 | Kanzaka et al. |
| 6,805,152 B2 | 10/2004 | Kanzaka et al. |
| 6,839,509 B2 | 1/2005 | Kuebler et al. |
| 6,851,440 B2 | 2/2005 | Kline |
| 6,854,658 B1 | 2/2005 | Houghton et al. |
| 6,860,288 B2 | 3/2005 | Uhler |
| 6,892,925 B2 | 5/2005 | Interrante et al. |
| 6,892,952 B2 | 5/2005 | Chang et al. |
| 6,895,995 B2 | 5/2005 | Kirkman et al. |
| 6,898,467 B1 | 5/2005 | Smith et al. |
| 6,929,188 B2 | 8/2005 | Taylor et al. |
| 6,932,112 B2 | 8/2005 | Bradford, III et al. |
| 7,000,854 B2 | 2/2006 | Malek et al. |
| 7,010,396 B2 | 3/2006 | Ware et al. |
| 7,017,884 B2 | 3/2006 | Brinks et al. |
| 7,124,452 B1 | 10/2006 | Bauza |
| 7,124,776 B1 | 10/2006 | Hwang |
| 7,147,203 B2 | 12/2006 | Terrell |
| 7,171,984 B2 | 2/2007 | Pawelzik et al. |
| 7,177,725 B2 | 2/2007 | Nortier et al. |
| 7,228,874 B2 | 6/2007 | Bolderheij et al. |
| 7,286,904 B2 | 10/2007 | Graham |
| 7,303,151 B2 | 12/2007 | Wu |
| 7,360,723 B2 | 4/2008 | Lev |
| 7,367,352 B2 | 5/2008 | Hagen et al. |
| 7,372,002 B2 | 5/2008 | Nakamura et al. |
| 7,403,839 B1 | 7/2008 | Kaplan |
| 7,406,980 B2 | 8/2008 | Pinette |
| 7,445,024 B2 | 11/2008 | Paterson et al. |
| 7,456,374 B2 | 11/2008 | Gerver et al. |
| 7,458,520 B2 | 12/2008 | Belz et al. |
| 7,475,827 B2 | 1/2009 | Schmitt |
| 7,546,848 B2 | 6/2009 | Koenekamp |
| 7,584,898 B2 | 9/2009 | Schmitt et al. |
| 7,624,757 B2 | 12/2009 | Schmitt |
| 7,657,948 B2 | 2/2010 | Tsai |
| 7,665,483 B1 | 2/2010 | Sid |
| 7,672,576 B2 | 3/2010 | Grossbach et al. |
| 7,694,359 B1 | 4/2010 | Hall |
| 7,726,333 B2 | 6/2010 | Hoshi et al. |
| 7,814,929 B2 | 10/2010 | Yewdall et al. |
| 7,819,134 B2 | 10/2010 | Izzy et al. |
| 7,823,603 B2 | 11/2010 | Cochart et al. |
| 7,857,234 B2 | 12/2010 | Daley et al. |
| 7,874,498 B2 | 1/2011 | Kempf et al. |
| 7,889,187 B2 | 2/2011 | Freier et al. |
| 8,028,935 B2 | 10/2011 | Leber |
| 8,051,507 B2 | 11/2011 | Lin |
| 8,118,240 B2 | 2/2012 | Rodenbeck et al. |
| 8,162,236 B2 | 4/2012 | Rodenbeck et al. |
| 8,366,013 B2 | 2/2013 | Chang et al. |
| 8,534,318 B2 | 9/2013 | Kanemaru et al. |
| 8,579,206 B2 | 11/2013 | Kline |
| 8,702,018 B1 | 4/2014 | Rivera |
| 8,950,426 B2 | 2/2015 | Yewdall et al. |
| 9,050,612 B2 | 6/2015 | Miller et al. |
| 9,182,047 B2 | 11/2015 | Peel et al. |
| 9,243,756 B2 | 1/2016 | Davidson et al. |
| 9,260,842 B2 | 2/2016 | Peel |
| 9,260,844 B2 | 2/2016 | Peel |
| 9,273,450 B2 | 3/2016 | Peel |
| 9,359,748 B1 | 6/2016 | Lamy et al. |
| 9,594,383 B2 | 3/2017 | Peel |
| 9,822,513 B2 | 11/2017 | Peel |
| 9,909,288 B2 | 3/2018 | Peel |
| 9,957,699 B2 | 5/2018 | Peel |
| 9,957,700 B2 | 5/2018 | Peel |
| 10,081,931 B2 | 9/2018 | Song |
| 11,391,021 B2 * | 7/2022 | Hobbs .................... F16K 11/22 |
| 2002/0019709 A1 | 2/2002 | Segal |
| 2002/0043281 A1 | 4/2002 | Gloodt |
| 2003/0079507 A1 | 5/2003 | Bruntz et al. |
| 2003/0080194 A1 | 5/2003 | O'Hara et al. |
| 2003/0088338 A1 | 5/2003 | Phillips et al. |
| 2003/0168111 A1 | 9/2003 | Koga et al. |
| 2004/0000594 A1 | 1/2004 | Beck et al. |
| 2004/0011412 A1 | 1/2004 | Wears et al. |
| 2004/0016816 A1 | 1/2004 | Ginter et al. |
| 2004/0193326 A1 | 9/2004 | Phillips et al. |
| 2005/0072850 A1 | 4/2005 | Cornwall et al. |
| 2005/0076960 A1 | 4/2005 | Luig et al. |
| 2005/0258258 A1 | 11/2005 | Jonte |
| 2006/0059616 A1 | 3/2006 | Grohe |
| 2006/0138246 A1 | 6/2006 | Stowe et al. |
| 2006/0144443 A1 | 7/2006 | Yewdall et al. |
| 2006/0161270 A1 | 7/2006 | Uskin et al. |
| 2006/0180212 A1 | 8/2006 | Eriksen |
| 2006/0214016 A1 | 9/2006 | Erdely et al. |
| 2006/0231638 A1 | 10/2006 | Belz et al. |
| 2006/0243813 A1 | 11/2006 | Beck |
| 2007/0001018 A1 | 1/2007 | Schmitt et al. |
| 2007/0067902 A1 | 3/2007 | Miller et al. |
| 2007/0080242 A1 | 4/2007 | Wang et al. |
| 2007/0119501 A1 | 5/2007 | Pinette |
| 2007/0221740 A1 | 9/2007 | Beck et al. |
| 2007/0221744 A1 | 9/2007 | Simon et al. |
| 2007/0246550 A1 | 10/2007 | Rodenbeck et al. |
| 2008/0006707 A1 | 1/2008 | Nobili |
| 2008/0067264 A1 | 3/2008 | Erickson et al. |
| 2008/0099088 A1 | 5/2008 | Boey |
| 2008/0105843 A1 | 5/2008 | Koenekamp |
| 2008/0112843 A1 | 5/2008 | Peel et al. |
| 2008/0156889 A1 | 7/2008 | Shapira et al. |
| 2008/0156903 A1 | 7/2008 | Leber |
| 2008/0167931 A1 | 7/2008 | Gerstemeier et al. |
| 2008/0196156 A1 | 8/2008 | Brewin |
| 2008/0203195 A1 | 8/2008 | Schmitt |
| 2008/0250556 A1 | 10/2008 | Mang et al. |
| 2008/0271238 A1 | 11/2008 | Reeder et al. |
| 2008/0302991 A1 | 12/2008 | Tseng |
| 2009/0000024 A1 | 1/2009 | Louis et al. |
| 2009/0007330 A1 | 1/2009 | Genord et al. |
| 2009/0056011 A1 | 3/2009 | Wolf et al. |
| 2009/0119142 A1 | 5/2009 | Yenni et al. |
| 2009/0119832 A1 | 5/2009 | Conroy |
| 2009/0200401 A1 | 8/2009 | Esche et al. |
| 2009/0261282 A1 | 10/2009 | Connors |
| 2009/0308951 A1 | 12/2009 | Suter |

(56) References Cited

U.S. PATENT DOCUMENTS

| | | |
|---|---|---|
| 2009/0321335 A1 | 12/2009 | Siemer et al. |
| 2010/0032500 A1 | 2/2010 | Righini |
| 2010/0051719 A1 | 3/2010 | Carlucci et al. |
| 2010/0095443 A1 | 4/2010 | Ueno et al. |
| 2010/0116224 A1 | 5/2010 | Leeland |
| 2010/0123013 A1 | 5/2010 | Beck et al. |
| 2010/0132803 A1 | 6/2010 | Fima |
| 2010/0155505 A1 | 6/2010 | Lopp et al. |
| 2010/0161144 A1 | 6/2010 | Crist |
| 2010/0193039 A1 | 8/2010 | Illingworth |
| 2010/0213279 A1 | 8/2010 | Frederick |
| 2010/0213282 A1 | 8/2010 | Peel et al. |
| 2010/0233295 A1 | 9/2010 | Gupta et al. |
| 2011/0031331 A1 | 2/2011 | Klicpera |
| 2011/0041561 A1 | 2/2011 | Apel |
| 2011/0088799 A1 | 4/2011 | Jung |
| 2011/0094481 A1 | 4/2011 | Zui et al. |
| 2011/0108135 A1 | 5/2011 | Zhong |
| 2011/0126919 A1 | 6/2011 | Izzy et al. |
| 2011/0155505 A1 | 6/2011 | Liang |
| 2011/0186138 A1 | 8/2011 | Hanna et al. |
| 2011/0192476 A1 | 8/2011 | Underwood et al. |
| 2011/0215163 A1 | 9/2011 | Chang et al. |
| 2011/0233295 A1 | 9/2011 | Yewdall et al. |
| 2011/0284101 A1 | 11/2011 | Thurau et al. |
| 2011/0289675 A1 | 12/2011 | Dunki-Jacobs et al. |
| 2012/0012768 A1 | 1/2012 | Yahr et al. |
| 2012/0079652 A1 | 4/2012 | Lemire et al. |
| 2012/0175428 A1 | 7/2012 | Jouneau et al. |
| 2012/0181224 A1 | 7/2012 | Rapin |
| 2012/0187200 A1 | 7/2012 | Thurau et al. |
| 2012/0330468 A1 | 12/2012 | Lopez Rodriguez |
| 2013/0019977 A1 | 1/2013 | Hung |
| 2013/0062422 A1 | 3/2013 | Marty et al. |
| 2013/0075483 A1 | 3/2013 | Marty et al. |
| 2013/0340162 A1 | 12/2013 | Peel |
| 2013/0341418 A1 | 12/2013 | Peel |
| 2014/0261694 A1 | 9/2014 | Peel et al. |
| 2014/0261744 A1 | 9/2014 | Sansum et al. |
| 2015/0096931 A1 | 4/2015 | Jensen |
| 2015/0308084 A1 | 10/2015 | Thompson et al. |
| 2016/0201695 A1* | 7/2016 | Biwersi ............... F15B 13/026 251/205 |
| 2016/0287471 A1 | 10/2016 | Urfig |
| 2017/0009435 A1 | 1/2017 | Burns |
| 2017/0050201 A1 | 2/2017 | Deivasigamani et al. |
| 2017/0120261 A1 | 5/2017 | Zhou et al. |
| 2018/0073227 A1 | 3/2018 | Peel |
| 2018/0195780 A1 | 7/2018 | Itou et al. |
| 2018/0239376 A1 | 8/2018 | Olberding et al. |
| 2019/0186336 A1 | 6/2019 | Lee |
| 2019/0204858 A1 | 7/2019 | Lange |
| 2019/0249785 A1 | 8/2019 | Son et al. |
| 2019/0264821 A1 | 8/2019 | Zhan |

FOREIGN PATENT DOCUMENTS

| | | |
|---|---|---|
| CN | 1053946 A | 8/1991 |
| CN | 2255233 Y | 6/1997 |
| CN | 1184907 A | 6/1998 |
| CN | 1053946 C | 6/2000 |
| CN | 2531183 Y | 1/2003 |
| CN | 1184907 C | 1/2005 |
| CN | 1831255 A | 9/2006 |
| CN | 101000111 A | 7/2007 |
| CN | 101362121 A | 2/2009 |
| CN | 201227179 Y | 4/2009 |
| CN | 201235319 Y | 5/2009 |
| CN | 201526709 U | 7/2010 |
| CN | 201680051 U | 12/2010 |
| CN | 201701121 U | 1/2011 |
| CN | 201739525 U | 2/2011 |
| CN | 201896985 U | 7/2011 |
| CN | 102272503 A | 12/2011 |
| CN | 202118366 U | 1/2012 |
| CN | 102380116 A | 3/2012 |
| CN | 202252130 U | 5/2012 |
| CN | 202901383 U | 4/2013 |
| CN | 202937823 U | 5/2013 |
| CN | 203585430 U | 5/2014 |
| CN | 203585433 U | 5/2014 |
| CN | 203585434 U | 5/2014 |
| CN | 206017786 U | 3/2017 |
| DE | 532590 C | 8/1931 |
| DE | 19516887 A1 | 11/1996 |
| DE | 19516887 C2 | 10/1998 |
| DE | 10033351 C1 | 2/2002 |
| DE | 102006008524 A1 | 8/2006 |
| DE | 102006024069 A1 | 11/2007 |
| DE | 202009004000 U1 | 8/2009 |
| DE | 202009007243 U1 | 11/2009 |
| DE | 202011000038 U1 | 6/2012 |
| DE | 102012100097 A1 | 7/2012 |
| DE | 102012100097 B4 | 2/2015 |
| DE | 102013225395 A1 | 6/2015 |
| DE | 102006008524 B4 | 3/2019 |
| EP | 1072830 A1 | 1/2001 |
| EP | 1072830 B1 | 9/2004 |
| EP | 1583920 A1 | 10/2005 |
| EP | 1583920 A4 | 2/2006 |
| EP | 1583920 B1 | 8/2009 |
| EP | 2169124 A2 | 3/2010 |
| EP | 2169124 A3 | 9/2011 |
| EP | 2169124 B1 | 12/2014 |
| FR | 1072830 A | 9/1954 |
| FR | 1346796 A | 12/1963 |
| FR | 2916033 A1 | 11/2008 |
| FR | 2916033 B1 | 1/2015 |
| GB | 1123256 A | 8/1968 |
| GB | 2081841 A | 2/1982 |
| GB | 2081841 B | 2/1984 |
| GB | 2143304 A | 2/1985 |
| GB | 2143304 B | 7/1986 |
| GB | 2503279 A | 12/2013 |
| GB | 2503279 B | 8/2014 |
| JP | 05108170 A | 4/1993 |
| JP | 08270834 A | 10/1996 |
| NL | 1035474 C2 | 11/2009 |
| NL | 1035475 C2 | 11/2009 |
| WO | 0049317 A1 | 8/2000 |
| WO | 2007096771 A2 | 8/2007 |
| WO | 2007096771 A8 | 11/2007 |
| WO | 2007096771 A3 | 12/2007 |
| WO | 2010021891 A1 | 2/2010 |
| WO | 2010060142 A1 | 6/2010 |
| WO | 2013190381 A1 | 12/2013 |
| WO | 2013190382 A1 | 12/2013 |
| WO | 2017079191 A1 | 5/2017 |
| WO | 2020092401 A1 | 5/2020 |

OTHER PUBLICATIONS

First Chinese Office Action for CN Appl. Ser. No. 201320360425.4 dated Oct. 16, 2013 (6 pages).
International Preliminary Report on Patentability and Written Opinion for PCT Appl. Ser. No. PCT/IB2013/001646 dated Dec. 31, 2014 (8 pages).
International Preliminary Report on Patentability and Written Opinion for PCT Appl. Ser. No. PCT/IB2013/001647 dated Dec. 31, 2014 (8 pages).
International Preliminary Report on Patentability and Written Opinion on PCT/IB2013/001647 dated Dec. 31, 2014 (8 pages).
International Search Report and Written Opinion for PCT Appl. Ser. No. PCT/IB2013/001646 dated Sep. 19, 2013 (12 pages).
International Search Report and Written Opinion for PCT Appl. Ser. No. PCT/IB2013/001647 dated Oct. 25, 2013 (11 pages).
Examination Report for EP Appl. Ser. No. 13744799.1 dated Nov. 5, 2015 (5 pages).
First Chinese Office Action on CN Appl. Ser. No. 201310249998.4 dated Jun. 1, 2015 (12 pages).
First Chinese Office Action on CN Appl. Ser. No. 201310250018.2 dated Apr. 3, 2015 (12 pages).

(56) References Cited

OTHER PUBLICATIONS

First Chinese Office Action on CN Appl. Ser. No. 201310250036.0 dated Mar. 20, 2015 (13 pages).
First Chinese Office Action on CN Appl. Ser. No. 201310250061.9 dated Mar. 23, 2015 (13 pages).
First Chinese Office Action on CN Appl. Ser. No. 201310250065.7 dated Mar. 27, 2015 (15 pages).
First Chinese Office Action on CN Appl. Ser. No. 201310250209.9 dated Apr. 22, 2015 (26 pages).
First Chinese Office Action on CN Appl. Ser. No. 201310250295.3 dated Mar. 20, 2015 (12 pages).
First Chinese Office Action on CN Appl. Ser. No. 201310250303.4 dated Mar. 20, 2015 (11 pages).
First Chinese Office Action on CN Appl. Ser. No. 201310250323.1 dated May 27, 2015 (11 pages).
First Chinese Office Action on CN Appl. Ser. No. 201310250339.2 dated Jun. 3, 2015 (13 pages).
First Chinese Office Action on CN Appl. Ser. No. 201310250369.3 dated Apr. 1, 2015 (14 pages).
First Chinese Office Action on CN Appl. Ser. No. 201310250422.X dated May 27, 2015 (14 pages).
First Chinese Office Action on CN Appl. Ser. No. 201310250704.X dated Mar. 31, 2015 (15 pages).
First Chinese Office Action on CN Appl. Ser. No. 201310250808.0 dated Jun. 1, 2015 (12 pages).
First Chinese Office Action on CN Appl. Ser. No. 201310251133.1 dated Mar. 31, 2015 (15 pages).
First Chinese Office Action on CN Appl. Ser. No. 201310251145.4 dated Mar. 20, 2015 (15 pages).
Second Chinese Office Action on CN Appl. Ser. No. 201310250018.2 dated Nov. 24, 2015 (8 pages).
Second Chinese Office Action on CN Appl. Ser. No. 201310250036.0 dated Dec. 11, 2015 (13 pages).
Second Chinese Office Action on CN Appl. Ser. No. 201310250061.9 dated Nov. 9, 2015 (8 pages).
Second Chinese Office Action on CN Appl. Ser. No. 201310250295.3 dated Nov. 5, 2015 (13 pages).
Second Chinese Office Action on CN Appl. Ser. No. 201310250303.4 dated Nov. 11, 2015 (12 pages).
Second Chinese Office Action on CN Appl. Ser. No. 201310250369.3 dated Oct. 29, 2015 (15 pages).
Second Chinese Office Action on CN Appl. Ser. No. 201310250422.X dated Dec. 11, 2015 (14 pages).
Second Chinese Office Action on CN Appl. Ser. No. 201310250704.X dated Oct. 26, 2015 (21 pages).
Second Chinese Office Action on CN Appl. Ser. No. 201310251133.1 dated Nov. 12, 2015 (14 pages).
Second Chinese Office Action on CN Appl. Ser. No. 201310251145.4 dated Nov. 11, 2015 (13 pages).
Fourth Chinese Office Action on CN Appl. Ser. No. 201310250369.3 dated Oct. 31, 2016 (10 pages).
Fourth Chinese Office Action on CN Appl. Ser. No. 201310250422.X dated Dec. 12, 2016 (8 pages).
Fourth Chinese Office Action on CN Appl. Ser. No. 201310250704.X dated Oct. 31, 2016 (11 pages).
Second Chinese Office Action on CN Appl. Ser. No. 201310249998.4 dated Jan. 21, 2016 (12 pages).
Second Chinese Office Action on CN Appl. Ser. No. 201310250065.7 dated Feb. 3, 2016 (10 pages).
Second Chinese Office Action on CN Appl. Ser. No. 201310250209.9 dated Jan. 4, 2016 (17 pages).
Second Chinese Office Action on CN Appl. Ser. No. 201310250323.1 dated Feb. 1, 2016 (13 pages).
Second Chinese Office Action on CN Appl. Ser. No. 201310250339.2 dated Mar. 4, 2016 (13 pages).
Second Chinese Office Action on CN Appl. Ser. No. 201310250808.0 dated Jan. 25, 2016 (8 pages).
Third Chinese Office Action on CN Appl. Ser. No. 201310249998.4 dated May 19, 2016 (11 pages).
Third Chinese Office Action on CN Appl. Ser. No. 201310250018.2 dated Jun. 20, 2016 (13 pages).
Third Chinese Office Action on CN Appl. Ser. No. 201310250036.0 dated Jun. 7, 2016 (12 pages).
Third Chinese Office Action on CN Appl. Ser. No. 201310250061.9 dated May 25, 2016 (7 pages).
Third Chinese Office Action on CN Appl. Ser. No. 201310250065.7 dated Aug. 19, 2016 (15 pages).
Third Chinese Office Action on CN Appl. Ser. No. 201310250209.9 dated Jul. 5, 2016 (16 pages).
Third Chinese Office Action on CN Appl. Ser. No. 201310250323.1 dated Jul. 15, 2016 (11 pages).
Third Chinese Office Action on CN Appl. Ser. No. 201310250339.2 dated Sep. 2, 2016 (13 pages).
Third Chinese Office Action on CN Appl. Ser. No. 201310250369.3 dated Apr. 25, 2016 (13 pages).
Third Chinese Office Action on CN Appl. Ser. No. 201310250422.X dated May 11, 2016 (14 pages).
Third Chinese Office Action on CN Appl. Ser. No. 201310250704.X dated Apr. 25, 2016 (7 pages).
Third Chinese Office Action on CN Appl. Ser. No. 201310250808.0 dated May 23, 2016 (11 pages).
Third Chinese Office Action on CN Appl. Ser. No. 201310251133.1 dated May 26, 2016 (13 pages).
EP Examination Report on EP Appl. Ser. No. 13744799.1 dated Jan. 25, 2017 (5 pages).
EP Examination Report on EP Appl. Ser. No. 13744799.1 dated Jun. 27, 2017 (4 pages).
Extended European Search Report and Written Opinion of EP Appl. Ser. 17180100.4 dated Dec. 7, 2017 (7 pages).
Extended European Search Report and Written Opinion of EP Appl. Ser. 17180103.8 dated Dec. 13, 2017 (7 pages).
Extended European Search Report and Written Opinion of EP Appl. Ser. 17180106.1 dated Dec. 13, 2017 (7 pages).
Extended European Search Report and Written Opinion of EP Appl. Ser. 17180111.1 dated Dec. 20, 2017 (7 pages).
Extended European Search Report and Written Opinion of EP Appl. Ser. 17180113.7 dated Dec. 20, 2017 (7 pages).
Fifth Chinese Office Action on CN Appl. Ser. No. 201310250422.X dated May 9, 2017 (7 pages).
Fourth Chinese Office Action on CN Appl. Ser. No. 201310250065.7 dated Apr. 26, 2017 (7 pages).
Fourth Chinese Office Action on CN Appl. Ser. No. 201310250323.1 dated Jan. 25, 2017 (7 pages).
Fourth Chinese Office Action on CN Appl. Ser. No. 201310250339.2 dated Mar. 3, 2017 (8 pages).
Third Chinese Office Action on CN Appl. Ser. No. 201310250303.4 dated Dec. 14, 2017 (7 pages).
Third Chinese Office Action on CN Appl. Ser. No. 201310251145.4 dated Dec. 18, 2017 (7 pages).
European Examination Report of EP Appl. Ser. 13744798.3 dated Aug. 28, 2018 (5 pages).
European Examination Report of EP Appl. Ser. 13744799.1 dated Oct. 1, 2018 (5 pages).
Extended European Search Report and Written Opinion of EP Appl. Ser. 17180027.9 dated Feb. 1, 2018 (7 pages).
Extended European Search Report and Written Opinion of EP Appl. Ser. 17180028.7 dated Jan. 5, 2018 (7 pages).
Extended European Search Report and Written Opinion of EP Appl. Ser. 17180029.5 dated Jan. 5, 2018 (7 pages).
Extended European Search Report and Written Opinion of EP Appl. Ser. 17180101.2 dated Jan. 24, 2018 (7 bages).
Extended European Search Report and Written Opinion of EP Appl. Ser. 17180109.5 dated Jan. 24, 2018 (7 pages).
Fifth Chinese Office Action on CN Appl. Ser. No. 201310249998.4 dated Sep. 29, 2018 (8 pages).
European Examination Report of EP Appl. Ser. 17180027.9 dated Dec. 17, 2019 (5 pages).
European Examination Report of EP Appl. Ser. 17180100.4 dated Dec. 17, 2019 (5 pages).
Fourth Chinese Office Action on CN Appl. Ser. No. 201310251133.1 dated Apr. 29, 2019 (7 pages).

(56) References Cited

OTHER PUBLICATIONS

Seventh Chinese Office Action on CN Appl. Ser. No. 201310249998.4 dated Oct. 22, 2019 (12 pages).
Sixth Chinese Office Action on CN Appl. Ser. No. 201310249998.4 dated Apr. 15, 2019 (17 pages).

* cited by examiner section J-J

Section P-P

PLUMBING COMPONENT

CROSS-REFERENCE TO RELATED PATENT APPLICATIONS

The present application is a Continuation of U.S. patent application Ser. No. 16/867,232, filed May 5, 2020, which claims priority to International Application No. PCT/GB2018/053122, filed Oct. 29, 2018, which claims the benefit of and priority to United Kingdom Priority Application No. 1718562.0, filed Nov. 9, 2017. The entire disclosures of each of the foregoing applications are incorporated by reference herein.

BACKGROUND

This application relates to a plumbing component. The plumbing component may be for controlling the mixture of two supplies of water having different temperatures. The plumbing component may, for example, be used in plumbing fixtures, fittings and water supply systems and installations for washing, showering, bathing and the like employing such plumbing fixtures and fittings.

An example of a prior art plumbing component that can be used to control the mixture of hot and cold water supplies is disclosed in International Patent Application No. PCT/IB2013/001646 (WO2013/190381).

PCT/IB2013/001646 discloses a mixing valve for use in controlling the mixture of two supplies of water having different temperatures, the mixing valve including a cold water inlet configured to receive a supply of cold water; a hot water inlet configured to receive a supply of hot water; an outlet configured to output cold water or hot water or a mixture thereof from the mixing valve; a first flow control valve for controlling the flow of cold water from the cold water inlet to the water outlet; and a second flow control valve for controlling the flow of hot water from the hot water inlet to the water outlet. Each of the first and second flow control valves include a valve inlet communicating with the associated water inlet, first and second valve outlets communicating with the water outlet, and a valve member assembly to control the flow of water through the first and second valve outlets. Each valve member assembly includes a first valve member configured to engage with a first valve seat associated with the first valve outlet in a closed position of the flow control valve and a second valve member configured to engage with a second, separate, valve seat associated with the second valve outlet in the closed position of the flow control valve. The valve members carry an elastomeric seal that engages with the valve seats to seal the valve outlets preventing flow of water in the closed position. The elastomeric seal is provided by an O-ring carried by each valve member.

SUMMARY

In one aspect, the present application provides: a plumbing component for controlling the mixture of two supplies of water having different temperatures, the plumbing component comprising any one or more of: a cold water inlet configured to receive a supply of cold water; a hot water inlet configured to receive a supply of hot water; an outlet configured to output cold water or hot water or a mixture thereof; a flow shut-off mechanism operable to restrict the flow of water out of the outlet; a first flow control valve for controlling the flow of cold water from the cold water inlet to the outlet; and a second flow control valve for controlling the flow of hot water from the hot water inlet to the outlet, each of the flow control valves comprising a valve member and an associated valve seat, each valve member arranged to engage with the associated valve seat to control the flow of water through the flow control valves to the water outlet, and wherein: one or both of the valve members comprises a graduated flow control bead arranged to seal against the associated valve seat to provide a graduated flow transition between a maximum flow state and a minimum flow state of the, or each, control valve.

The plumbing component advantageously provides a combination of a flow shut-off mechanism and a graduated flow control bead. This may provide both a smooth graduated transition of water flow through the flow control valves between a maximum and minimum flow rate and a secure flow shut-off to prevent residual water flow from the outlet. For example, the minimum flow rate may still allow a small amount of water to flow through the flow control valves. This may be prevented from flowing out of the outlet by the shut-off mechanism.

Optionally, the graduated flow control bead or beads may each comprise a sealing surface which is arranged to seal against a corresponding sealing surface of the associated valve seat, wherein the flow rate through the respective flow control valve is determined by the extent of the contact between the sealing surface of the graduated flow control bead and the associated valve seat. This may allow graduated control of the flow during movement of the valve member relative to the valve seat and give finer adjustment resolution of the flow rate.

Optionally, the, or each, graduated flow control bead is arranged to move relative to the associated valve seat, and wherein the movement may be between any of the following positions: i) a minimum seal position in which there is no sealing contact between the, or each, graduated flow control bead and the associated valve seat; ii) a first partial seal position in which part of the sealing surface of the, or each, graduated flow control bead is in sealing contact with the valve seat; iii) a second partial seal position in which part of the sealing surface of the, or each, graduated flow control bead is in sealing contact with the associated valve seat, wherein in the second partial seal position a greater extent of the sealing surface of the graduated flow control bead is in sealing contact with the associated valve seat in comparison to the first partial seal position; and iv) a maximum seal position in which a maximum extent of the sealing surface of the, or each, graduated flow control bead is in sealing contact with the associated valve seat.

This may provide improved control of the flow graduation compared to a valve member which does not provide partial seal positions.

Optionally, one or both of the shape and configuration of the graduated flow control bead compared to the shape and configuration of the associated valve seat may provide the graduated flow transition. This may allow the sealing contact between the valve member and valve seat to provide a graduated flow transition.

Optionally, the valve member has a longitudinal axis, and wherein the longitudinal axis is arranged parallel to a first direction in which the graduated control bead is arranged to move relative to the valve seat.

Optionally, the, or each, graduated flow control bead may not be a planar bead that extends only in a plane normal to the longitudinal axis. By forming the graduated flow control bead from a shape which is not a planar bead a more graduated flow transition may be provided.

Optionally, at least part of a sealing surface of the, or each, graduated flow control bead may be shaped so that it is inclined relative to a plane normal to the longitudinal axis. This means that an increasing or decreasing sealing area between the graduated flow control bead and the valve seat may be provided as they move towards or away from each other.

Optionally, the, or each, graduated flow control bead may have a shape that extends between a first extent and a second extent along the length of the valve member, the distance between the first and second extent being greater than a thickness of the graduated flow control bead, and optionally wherein the distance is 2 to 6 times greater. This means that the graduated flow control bead may have an elongate shape which at least partly extends in a direction along the length of the valve member. This may allow a suitable sealing contact between them to provide a graduated flow transition.

Optionally, the, or each, graduated flow control bead may be shaped to follow a path having three or more turning points around the valve member. This may provide a varying sealing contact with the associated valve seat to provide an improved graduated flow transition.

Optionally, the, or each, graduated flow control bead follows an undulating or zigzag path extending along a surface of the respective valve member, and preferably wherein the path is a sinusoidal path.

Optionally, a movement of between 0 mm and 9 mm of the, or each, graduated flow control bead relative to the associated valve seat may cause a change in flow rate between the minimum flow state and the maximum flow state. This may provide an improved resolution of flow rate change for a corresponding distance moved by the valve member. In other words, a larger movement of the valve member may provide the same change in flow rate compared to a non-graduated flow control bead.

Optionally, the thickness of the, or each, graduated flow control bead is between 0.5 mm and 1.5 mm. This may provide a suitable graduated flow transition.

Optionally, the flow shut-off mechanism may be formed by a flow shut-off bead forming part of each valve member, wherein each flow shut-off bead may be arranged to contact the valve seat to provide a transition between an open and a closed state of each control valve. This may allow each valve member to provide both a graduated flow transition and a final flow shut-off transition to stop any residual flow.

Optionally, each flow shut-off bead may be a planar bead that extends only in a plane normal to the longitudinal axis. This may provide a secure final flow shut-off, compared to the graduated flow transition provided by the graduated flow control bead.

Optionally, the flow shut-off mechanism may comprise an electronic shut-off mechanism, such as a solenoid, that is movable between a shut-off position in which the flow of water out of the outlet is restricted and an open position in which flow of water out of the outlet is unrestricted. This may provide a suitable secure flow final shut-off to remove any residual flow remaining when the graduated flow control bead(s) are in a maximum seal position.

Optionally, the water flows through the plumbing component along a water flow path, and wherein the electronic shut-off mechanism may be provided at a point along the water flow path between each of the control valves and an aperture forming the outlet. This may allow the flow shut-off mechanism to stop any residual flow allowed by the flow control valves.

Optionally, the outlet is one of a plurality of outlets, each outlet being arranged to receive water from the first and/or second control valves, and wherein the flow shut-off mechanism may comprise a plurality of solenoids arranged to independently control the flow of water through each of the plurality of outlets. This may allow the plumbing component to supply water to a number of different outlets of a plumbing assembly or system. It may, for example, supply more than one shower head of a shower system.

Optionally, the plumbing component may further comprise a controller configured to control any one or more of the first control valve, the second control valve or the flow shut-off mechanism in response to at least one of the water temperature or flow rate. This may allow the temperature and/or the flow rate of water exiting the outlet to be adjusted.

Optionally, the controller may be configured to receive temperature or flow rate information from a sensor or sensors, the sensor being arranged to monitor at least one of the temperature or the flow rate of water flowing from the outlet. This may allow the temperature and flow rate to be adjusted to reach target valves which may, for example, be set by the user.

Optionally, the sensor may be arranged to monitor the temperature and/or the flow rate of water flowing along a flow path through the plumbing component between each of the control valves and the outlet. This may allow the temperature and/or flow rate to be monitored once the water has left the flow control valves.

Optionally, the plumbing component may comprise a housing that houses the flow shut-off mechanism and the first and second control valves and includes apertures that form the cold water inlet, the hot water inlet and the outlet or outlets.

Optionally, the housing may be formed from a polymer material. This may make the plumbing component suitable for domestic use as it may be more efficiently produced.

Optionally, each valve member may be mounted on a shaft and the, or each, graduated flow control bead may comprise a sleeve around an outer surface of the valve member. Optionally the sleeve may comprise an elastomeric material. This may provide an efficient way of coupling the valve member and graduated flow control bead and provide a suitable seal with the valve seat.

Optionally, the plumbing component may further comprise a cold water outlet and a hot water outlet, wherein: the cold water inlet is fluidly coupled to both an inlet of the first flow control valve and the cold water outlet; and the hot water inlet is fluidly coupled to both an inlet of the second flow control valve and the hot water outlet, wherein the hot and cold water outlets are adapted to be connectable to the hot and cold water inlets of another plumbing component. This may allow a number of plumbing components to be connected in series with one another. This may reduce the amount of water pipes required to connect the plumbing components to a supply of hot and cold water compared to if they were connected in parallel.

In an second aspect, the present application provides a plumbing assembly comprising a first plumbing component according to the first aspect (or the third aspect below) and a second plumbing component according to first aspect (or the third aspect below), wherein: the cold water outlet of the first plumbing component is fluidly coupled to the cold water inlet of the second plumbing component; and the hot water outlet of the first plumbing component is fluidly coupled to the hot water inlet of the second plumbing component. This may allow the plumbing components to be connected in series or stacked together.

Optionally, the plumbing assembly may further comprise a controller arranged to control the flow control valves of the first and second plumbing components such that the temperature of water flowing from the outlet of the first plumbing component is different from that of the second plumbing component. This may allow the temperature and/or flow rate of water provided by the first plumbing component and the second plumbing component to be independently controlled.

In a third aspect, the present application provides a plumbing component for controlling the mixture of two supplies of water having different temperatures, the plumbing component comprising: a cold water inlet configured to receive a supply of cold water; a hot water inlet configured to receive a supply of hot water; an outlet configured to output cold water or hot water or a mixture thereof; a flow shut-off mechanism operable to restrict the flow of water out of the outlet; a first flow control valve for controlling the flow of cold water from the cold water inlet to the outlet; and a second flow control valve for controlling the flow of hot water from the hot water inlet to the outlet, each of the flow control valves comprising a valve member and an associated valve seat, each valve member arranged to engage with the associated valve seat to control the flow of water through the flow control valves to the water outlet, and wherein: the plumbing component further comprises a graduated flow control mechanism arranged to provide a graduated flow transition between a maximum flow state and a minimum flow state of the, or each, control valve.

Optionally, the graduated flow control mechanism may comprise one or more sealing surfaces which are arranged to seal against a corresponding sealing surface of the associated valve seat or valve member, wherein the flow rate through the respective flow control valve is determined by the extent of the contact between the sealing surface or surfaces and the associated valve seat or valve member.

Optionally, the, or each, valve member is arranged to move relative to the associated valve seat, and wherein the movement is between any of the following positions: i) a minimum seal position in which there is no sealing contact between the, or each, sealing surface and the associated valve seat or valve member; ii) a first partial seal position in which part of the or each sealing surface is in sealing contact with the associated valve seat or valve member; iii) a second partial seal position in which part of the or each sealing surface is in sealing contact with the associated valve seat or valve member, wherein in the second partial seal position a greater extent of the sealing surface is in sealing contact with the associated valve seat or valve member in comparison to the first partial seal position; and iv) a maximum seal position in which a maximum extent of the or each sealing surface is in sealing contact with the associated valve seat or valve member.

Optionally, one or both of the shape and configuration of the sealing surface formed by the graduated flow control mechanism compared to the shape and configuration of the associated valve seat or valve member provides the graduated flow transition.

Optionally, the graduated flow control mechanism may be formed by one or both of the valve members comprising a graduated flow control bead arranged to seal against the associated valve seat to provide a graduated flow transition between a maximum flow state and a minimum flow state of the, or each, control valve.

Optionally, the graduated flow control mechanism may be additionally or alternatively formed by a graduated flow control portion of the valve seat, the graduated flow control portion being shaped to provide a graduated flow transition between the maximum flow state and the minimum flow state of the, or each, control valve.

Optionally, the graduated flow control portion of the valve seat may comprise a tapered portion of a bore forming the valve seat.

Any of the features described in relation to the first or second aspect may be used in combination with the third aspect.

BRIEF DESCRIPTION OF THE DRAWINGS

Embodiments of the invention will now be described, by way of example only, with reference to the accompanying drawings, in which:

FIG. 5b shows a cross section view corresponding to FIG. 5a;

FIG. 7a shows a perspective view of a mixer valve used in a plumbing component according to an embodiment;

FIG. 7b shows a side view of the mixer valve shown in FIG. 7a;

FIG. 9b shows a cross section view corresponding to FIG. 9a;

DETAILED DESCRIPTION

Figure 1:
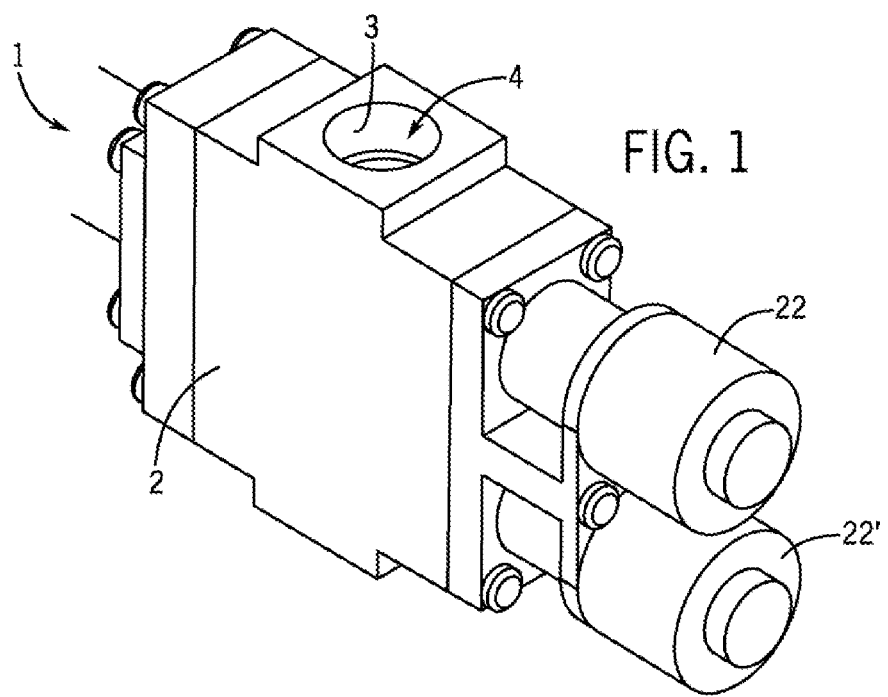
FIG. 1 shows a perspective view of a mixer valve used in a plumbing component according to an embodiment.

According to one embodiment, a plumbing component for controlling the mixture of two supplies of water having different temperatures (e.g. hot and cold water supplies) is disclosed. The plumbing component may output water having a desired temperature for use and may also control the output flow rate.

The plumbing component may be incorporated into a plumbing fixture or fitting for washing, showering, bathing or the like and water supply systems and installations employing such plumbing fixtures and fittings. For example, the plumbing component may be incorporated in a tap (or faucet) for a basin, sink, shower bath or the like. The plumbing component may be incorporated in a water supply system or installation having one or more outlets for washing, showering, bathing or the like. Each outlet may include a tap (or faucet) incorporating the plumbing component. Alternatively, the plumbing component may be incorporated in a fitting supplying more than one outlet. For example, multiple shower heads may be supplied with water from one plumbing component as will be described in further detail later.

The plumbing component according to one embodiment generally comprises a cold water inlet configured to receive a supply of cold water; a hot water inlet configured to receive a supply of hot water; and an outlet configured to output cold water or hot water or a mixture thereof.

The plumbing component comprises a first flow control valve for controlling the flow of cold water from the cold water inlet to the outlet and a second flow control valve for controlling the flow of hot water from the hot water inlet to the outlet. The first and second control valves may therefore form a mixer (or mixing) valve to control the temperature and rate of flow of water flowing from the outlet.

Each of the flow control valves may comprise a valve member and an associated valve seat. Each valve member may be arranged to engage with the associated valve seat to control the flow of water through the flow control valves to the water outlet.

The plumbing component further comprises a flow shut-off mechanism operable to restrict the flow of water out of the outlet. The flow shut-off mechanism may provide a transition between an open and closed state. In the closed state the flow of water through the flow shut-off mechanism may be zero or approximately zero. It may therefore provide a secure shut-off of the water supply from the outlet to prevent undesired residual water flow (e.g. it may reduce dripping of a shower or tap being supplied by the plumbing component).

One or both of the valve members comprises a graduated flow control bead arranged to seal against the associated valve seat to provide a graduated flow transition between a maximum flow state and a minimum flow state of the, or each, control valve. By a graduated flow transition we may mean a smooth or gradual transition from there being a maximum level of flow to minimum level of flow. In some embodiments, the minimum level of flow may be a small or residual flow of water e.g. a drip. In yet other embodiments, the minimum level of flow may be zero or approximately zero. In some embodiments, the maximum flow level may correspond to the valve being open with no restriction of the water flow. The graduated flow transition is in contrast to a sharp or immediate transition between the valve allowing a maximum level of flow and a minimum level of flow.

The plumbing component may advantageously provide both a graduated flow transition and a separate flow shut-off. The graduated control of the rate of flow of hot and cold water out of the outlet allows the temperature and flow rate of output water to be accurately and smoothly controlled between maximum and minimum flow rates. The flow shut-off mechanism provides a separate secure shut-off that may not otherwise be provided by the graduated flow control bead(s) even when the flow rate is at the minimum. This may reduce any residual flow that may be allowed by the graduated flow control bead(s) and may reduce undesired dripping of a tap or shower being supplied by the plumbing component.

Figure 2:
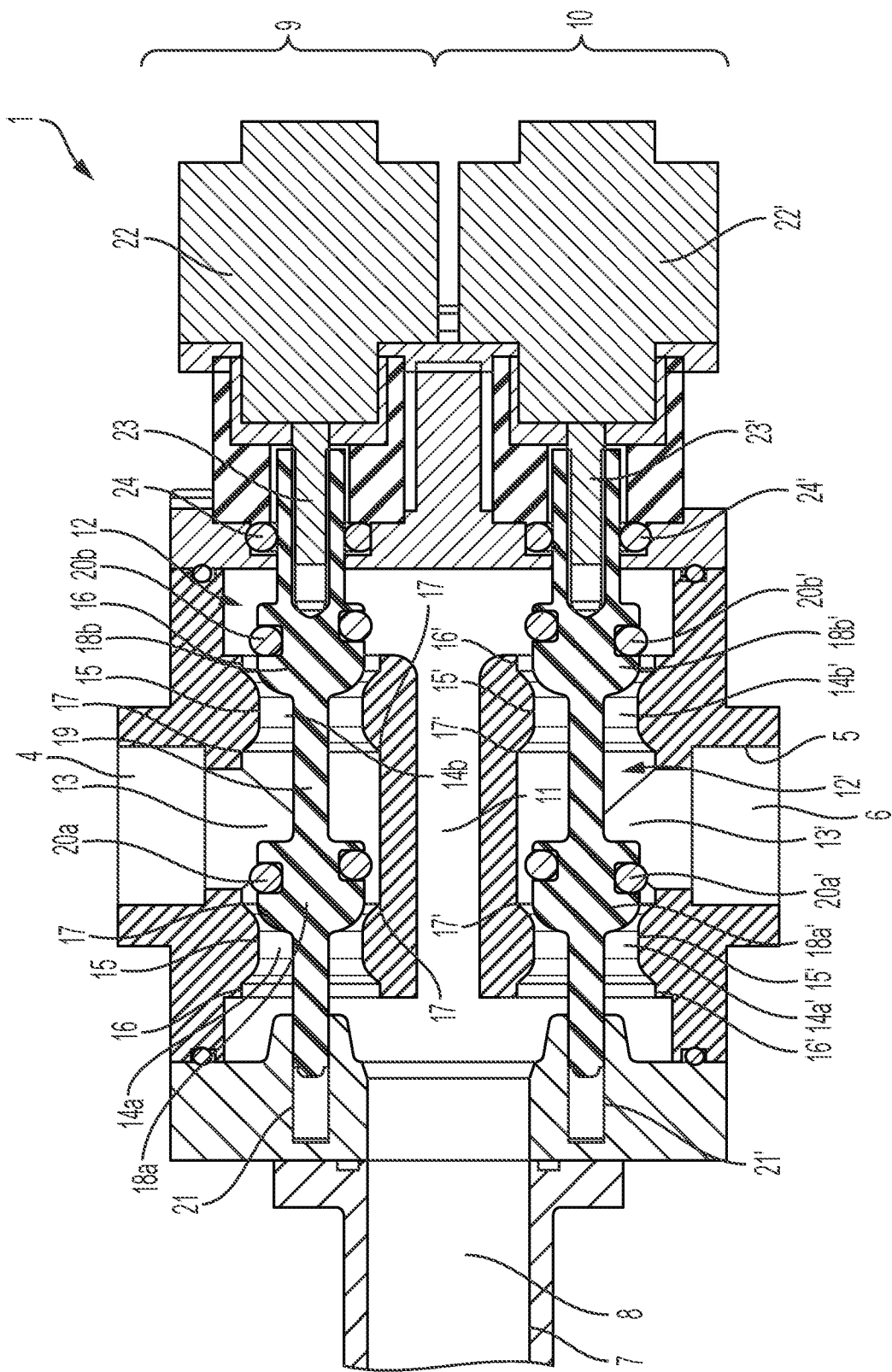
FIG. 2 shows a cross section through the mixer valve shown in FIG. 1.

A mixer valve suitable for use in the plumbing component is shown in more detail in FIGS. 1 and 2. In some embodiments, the mixer valve may be as described in International patent application no PCT/IB2013/001646 (which is hereby incorporated by reference), but adapted to include a graduated flow control bead. FIG. 1 shows a mixer valve 1 enclosed within a valve housing 2. An aperture 3 in the housing 2 forms a first fluid inlet 4 for receiving a first fluid (cold water in this embodiment). Similarly, as shown in the cross section view of FIG. 2, the housing 2 includes a further aperture 5 that forms a second fluid inlet 6 for receiving a second fluid (hot water in this embodiment) and a still further aperture 7 that forms a fluid outlet 8 for outputting the first fluid or the second fluid or a mixture thereof.

In the described embodiment, the mixer valve 1 comprises a first flow control valve 9 and a second flow control valve 10 located within a mixing chamber 11. The first flow control valve 9 controls the flow of fluid from the first fluid inlet 4 to the mixing chamber 11. The second flow control valve 10 controls the flow of fluid from the second fluid inlet 6 to the mixing chamber 11. The mixing chamber 11 provides a volume in which the first and second fluids can mix and directs the mixed fluid to the fluid outlet 8.

The first and second flow control valves 9, 10 may be similar and are arranged side by side in parallel and on opposite sides of the mixing chamber 11. There follows a description of the construction and operation of the first flow control valve 9 and the same reference numerals have been used but with an additional apostrophe to identify similar features of the second flow control valve 10 such that the construction and operation of the second flow control valve 10 will be apparent and understood from the description of the first flow control valve 9.

The first flow control valve 9 comprises a valve member assembly 12, a valve inlet chamber 13 and first and second valve outlets 14a and 14b. The inlet chamber 13 is substantially cylindrical in the described embodiment, but may be other suitable shape in other embodiments, and may be square or oval for example. The first fluid inlet 4 opens into the inlet chamber 13 through the side wall of the inlet chamber 13 (the second inlet 6 opens into the valve inlet chamber 13' of the second flow control valve 10 through the side wall of the inlet chamber 13').

The first valve outlet 14a is arranged at one end of the inlet chamber 13 and the second valve outlet 14b is arranged at an opposed end of the inlet chamber 13. Each of the valve outlets 14a and 14b comprises a through bore with a cylindrical centre section 15 of reduced diameter relative to the end sections 16, 17. The bore is tapered between the centre section 15 and the end sections 16, 17. The valve outlets 14a and 14b are axially aligned and in this embodiment the centre sections 15 of the outlets 14a and 14b are coaxial and have the same diameter. The valve member assembly 12 controls the flow of water through the first flow control valve 9 from the inlet chamber 13 to the mixing chamber 11. In the described embodiment, the centre section 15 and end sections 16, 17 are circular in cross section. This is however only one such example, in other embodiments these components may have any other suitable cross section and may be square or oval, for example.

The valve member assembly 12 comprises a first valve member 18a adapted to cooperate with the first valve outlet 14a and a second valve member 18b adapted to cooperate with the second valve outlet 14b to control flow of water from the inlet chamber 13 to the mixing chamber 11. The first and second valve members 18a, 18b are fixedly mounted on a shaft 19 such that they are held a predetermined distance apart. The predetermined distance corresponds to the distance between the first and second valve outlets 14a, 14b.

A first end of the shaft 19 is received within a blind guide bore 21 formed in the housing 2. A second, opposed end of the shaft 19 extends through an opening in the housing 2 and is connected to an actuator 22. The actuator 22 is connected to the housing 2. The actuator 22 is adapted to control the linear position of the shaft 19 and thus the position of the first and second valve members 18a, 18b with respect to the valve outlets 14a, 14b.

The actuator 22 may comprise a stepper motor arranged to move the shaft 19 linearly in an axial direction. Any suitable actuator for controlling linear motion of the shaft may be employed in place of the stepper motor including, but not limited to, linear actuators. The actuator 22 is connected to the shaft 19 by a shaft connector portion 23 coupled to the second end of the shaft 19 that extends through an opening in the housing 2. An elastomeric seal 24 engages the second end of the shaft 19 within the opening to prevent leakage of water from the mixing chamber 11. The seal 24 could be an O-ring located in a groove in the housing 2.

The first fluid inlet 4 opens to the inlet chamber 13 between the first and second valve outlets 14a, 14b. When opening the first flow control valve from a closed position, the force exerted by the water acts to resist opening movement of the first valve member 18a and to assist opening movement of the second valve member 18b. When closing the first flow control valve from an open position, the force exerted by the water acts to resist closing movement of the second valve member 18b and to assist closing movement of the first valve member 18a.

In the described embodiment, the valve outlets 14a, 14b are arranged to present substantially the same area to the water flow and arranging the valve members 18a, 18b so that water acts on the valve members 18a, 18b in opposite directions and with substantially the same force, the valve member assembly 12 of the first flow control valve 9 is essentially balanced. As a result, there is substantially no net force on the valve member assembly 12 due to force exerted by the water pressure when opening and closing the first flow control valve 9. In other embodiments, the valve outlets 14a, 14b may be of different cross sectional shapes or have different cross sectional areas to each other. In such embodiments, the forces may not therefore be balanced.

Each of the valve members 18a, 18b comprises a graduated flow control bead 20a, 20b arranged to seal against the associated valve seat formed by the centre section 15 of the first and second valve outlets 14a, 14b to seal the valve outlets 14a, 14b controlling flow of water from the inlet chamber 13 to the mixing chamber 11. Each of the valve members 18a, 18b is movable relative to the associated valve seat to provide a transition between a maximum flow state and a minimum flow state of the respective flow control valve.

The engagement between one of the graduated flow control beads and the valve seat is shown in FIGS. 3a to 3d. In this embodiment, a flow control valve 200 is shown schematically, with some components shown in FIG. 2 omitted for ease of explanation. The flow control valve 200 comprises a valve member 202 that engages with a corresponding valve seat 204. The valve member 202 comprises a graduated flow control bead 206 which is arranged to sealably couple to the valve seat 204.

The graduated flow control bead 206 comprises a sealing surface which is arranged to seal against a corresponding sealing surface of the valve seat 204. The flow rate of fluid through the flow control valve may be determined by the extent of the contact between the sealing surface of the graduated flow control bead 206 and the valve seat 204. For example, an increase in the extent of the sealing surface in sealing contact with the valve seat 204 may cause a corresponding reduction in the flow of water through the flow control valve 200. A decrease in the extent of the sealing surface in sealing contact with the valve seat 204 may cause a corresponding increase in the flow of water through the flow control valve 200.

Figure 3A:
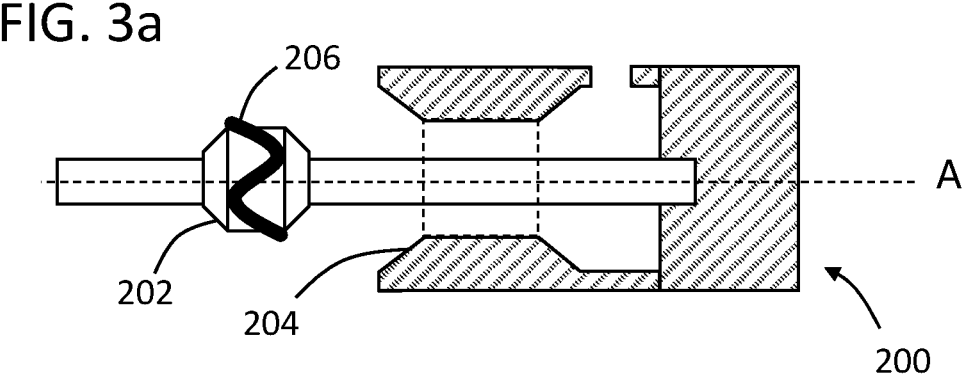
FIGS. 3a to 3d show a schematic view of a valve member and valve seat of the plumbing component according to an embodiment.
Figure 3B:
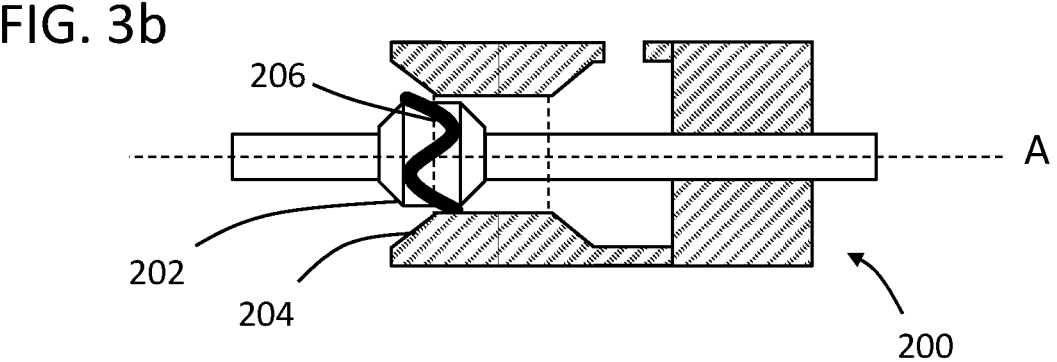
Figure 3C:
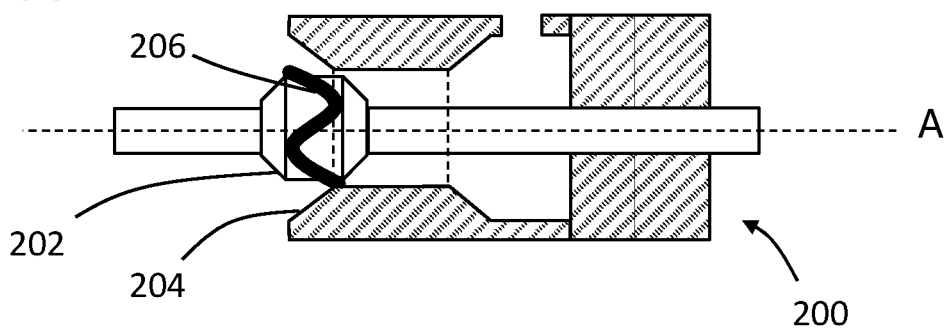
Figure 3D:
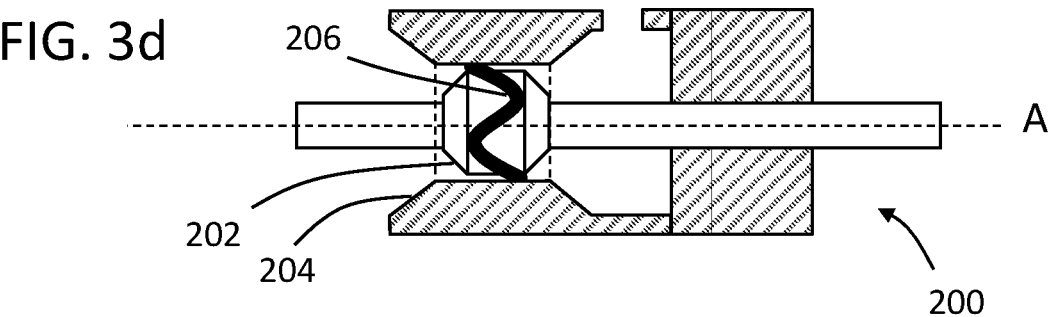

The flow control bead 206 is shown in a minimum seal position in FIG. 3a, a first partial seal position in FIG. 3b, a second partial seal position in FIG. 3c and a maximum seal position in FIG. 3d.

In the minimum seal position of FIG. 3a, there is no sealing contact between the graduated flow control bead 206 and the valve seat 204 (i.e. the minimum seal position is therefore an unsealed position). The flow of fluid through the valve 200 is therefore not restricted and the flow control valve 200 is in a maximum flow state. In the case of the embodiment shown in FIG. 2, the maximum flow state of the first flow control valve 9 is provided when the first valve member 18a is located within the inlet chamber 13 upstream of the associated valve outlet 14a and the second valve member 18b is located outside the inlet chamber 13 downstream of the associated valve seat 18b in the mixing chamber waterway.

In the first partial seal position of FIG. 3b part of (but not a maximum amount, or all of) the sealing surface of the graduated flow control bead 206 is in sealing contact with the valve seat 204. The flow of fluid through the valve is therefore partly restricted as not all of the extent of the sealing surface engagement required to provide the maximum seal position is present. The rate of flow is therefore reduced compared to the minimum seal position, but not reduced to the level of the maximum seal position. In the case of the embodiment shown in FIG. 2, the first (and second) partial seal positions correspond to where the first valve member 18a is partially received within the associated valve outlet 14a (e.g. as shown in FIG. 2) and the second valve member 18b is partially received within the associated valve seat 18b in the mixing chamber waterway.

In the second partial seal position of FIG. 3c part (but not a maximum amount or all of) of the sealing surface of the graduated flow control bead 206 is again in contact with the valve seat 204. In the second partial seal position, a greater extent or amount of the sealing surface of the graduated flow control bead 206 is in sealing contact with the valve seat 204 in comparison to the first partial seal position. This results in a reduced flow of fluid through the flow control valve 200 compared to the first partial seal position. The flow of fluid is however not reduced to the flow rate of the minimum flow rate of the maximum seal position.

In the maximum seal position of FIG. 3d, a maximum extent of the sealing surface of the graduated flow control bead 206 is in sealing contact with the valve seat 204. This may be the extent of the sealing surface required to reduce the flow through the flow control valve to a minimum. In this position, flow of fluid through the flow control valve may be restricted so that there is a minimum flow (or no flow of fluid and the valve is in a closed state). In the embodiment of FIG. 2, the maximum seal position corresponds to a position where the first and second valve members 18a, 18b are completely received in the centre sections 15 of the first and second valve outlets 14a, 14b and the graduated flow control bead 20a, 20b engages the valve seats provided by the centre section 15 of the first and second valve outlets 14a, 14b to seal the valve outlets 14a, 14b preventing flow of water from the inlet chamber 13 to the mixing chamber 11.

Movement from the maximum seal position to the minimum seal position via the first and second partial seal positions therefore provides a graduated transition between a maximum and minimum flow state of the flow control valve 200. The reverse movement also provides a graduated transition between a minimum and a maximum flow state.

As can be seen in FIGS. 3a-3d, the relative shape and/or configuration between the flow control bead 206 and the associated valve seat 204 provides the graduated flow transition. The relative shape and/or configuration allows for varying amounts of the flow control bead 206 to come into sealing contact during its motion relative to (and in contact with) the valve seat 204. This allows a varying sized aperture to be formed between the valve member 202 and valve seat 204 as they move relative to each other that allows a smoothly varying or graduated flow transition.

FIGS. 3a-3d show one embodiment of a graduated flow control bead 206 that provides a graduated flow transition. In this embodiment, the valve member 202 has a longitudinal axis (labelled A in the Figures). The longitudinal axis is arranged parallel to a first direction in which the valve member 202 (and so also the graduated control bead 206) is arranged to move relative to the valve seat 204. In the described embodiment, the longitudinal axis A corresponds to a central axis of the valve seat 204. In this embodiment, the valve seat 204, the valve member 202 and the graduated flow control bead 206 are therefore all arranged concentrically to each other. This is however only one such example, and other configurations of the valve seat 204 and valve member 202 may be provided where only some of these components are concentrically aligned.

In the described embodiment, the valve member 202 is received within the valve seat 204 to provide a sealing contact between them. The valve seat 204 is therefore formed by a sealing surface on the internal wall of a hole or aperture in the body of the plumbing component. The valve member 202 may have a corresponding outer surface along the length of the valve member 202 (the length being along an axis corresponding to the direction of movement of the valve member 202 relative to the valve seat 204). The outer surface of the valve member 202 may have a corresponding shape such that it can be received in the aperture forming the valve seat 204. In the described embodiment, both of the aperture forming the valve seat 204 and the valve member 202 are circular in cross section. In other embodiments, they may have any other cross section such as square or oval. The graduated flow control bead 206 is provided on the outside surface of the valve member 202 such that it may sealably couple to the inside surface of the valve seat 204. As can be seen in the Figures, the flow control bead 206 may protrude radially from a sidewall of the valve member 202 and so may contact the inside sealing surface of the valve seat 204 when they move relative to each other. In the minimum seal position, the valve member is not received within the aperture formed by the sealing surface of the valve seat, in the partial seal positions the valve member is partly received within the aperture formed by the sealing surface of the valve seat and in the maximum seal position the valve member is completely received within the aperture formed by the sealing surface of the valve member.

Figure 4:
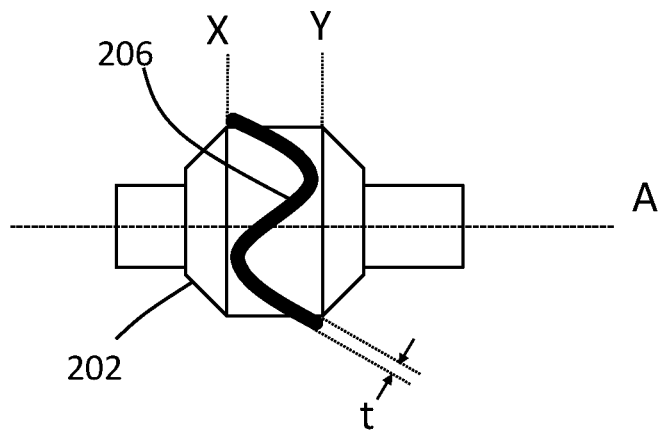
FIG. 4 shows a close up view of a graduated flow control bead of the plumbing component according to an embodiment.

Further detail of the graduated flow control bead 206 is shown in the close up view of FIG. 4. In the described embodiment, at least part of a sealing surface of the graduated flow control bead 206 is shaped so that it is inclined relative to a plane normal to the longitudinal axis A. This means that an increasing amount of the graduated flow control bead 206 will come into sealing contact with the valve seat 204 as they move relative to each other along the first direction.

The graduated flow control bead 206 may be shaped such that it extends between a first extent (labelled "X" in FIG. 4) and a second extent (labelled "Y" in FIG. 4) along the length of the valve member 202 (the length being parallel to the axis A). In such an embodiment, the distance between the first extent X and second extent Y is greater than the thickness (labelled "t" in FIG. 4) of the graduated flow control bead 206 itself. This means that the graduated flow control bead 206 has a generally elongate shape and is configured such that it extends in a direction having a component along the length of the valve member 202. The distance between the first extent X and the second extent Y may determine the inclination of the sealing surface relative to the valve seat 204. In some embodiments, the distance between the first extent X and the second extent Y may be multiple times greater than the thickness, e.g. may be 2 to 6 times greater that the thickness of the flow control bead 206, and preferably may be approximately 3 times greater.

In the described embodiment, the graduated flow control bead 206 is shaped to follow a path on the outer surface of the valve member, wherein the path may have three or more turning points around the valve member 202. Four such turning points can be seen in the view shown in FIG. 4. In one embodiment, the graduated flow control bead 206 may have only two turning points along the length of the valve member 202. In such an embodiment, the flow control bead 206 forms an elliptical shape around the valve member 202.

In the described embodiment, the graduated flow control bead 206 follows an undulating or zigzag path along the surface of the respective valve member. The shape of the graduated flow control bead is therefore formed by a plurality of periodic oscillations. The amplitude of the oscillations may determine the inclination of the sealing surface relative to the valve seat 204 and thus determine the graduation of the flow transition. In some embodiments, the graduated flow control bead may follow a sinusoidal path along the surface of the valve member.

In some embodiments, the graduated flow control bead 206 is provided as a separate component which is attached to the surface of the valve member 204. In other embodiments, the graduated flow control bead 206 may be formed by a resilient portion over molded onto an outwardly facing surface of the valve member 202. For example, the graduated flow control bead 206 may be formed as part of a sleeve extending around the valve member 204. In yet other embodiments, the graduated flow control bead 206 may be formed integrally with the valve member 202. The graduated flow control bead 206 may be formed from any suitable material that will provide a sealing engagement with the valve seat 204. The graduated flow control bead 206 may, for example, be formed from an elastomer material such as EPDM, TPE, LSR etc.

The embodiment shown in FIG. 4 is only one example of a graduated flow control bead 206 that provides a graduated flow transition. In other embodiments, there may be other suitable shapes and configurations of graduated flow control bead 206 and valve seat 204 that may also provide a graduated flow transition.

For example, in some embodiments, the graduated flow control bead 206 may be a shape and/or configuration such that is it not a planar bead that extends only in a plane normal to the longitudinal axis A. This means that the graduated flow control bead 206 is arranged such that all of its sealing surface required to achieve the minimum flow state (or to close the valve) does not come into simultaneous contact with the valve seat 204. E.g., the graduated flow control bead is not provided by a perpendicularly configured O-ring as shown in FIGS. 2 to 4 of International application PCT/IB2013/001646 (WO2013/190381).

The degree of graduated flow transition may be quantified by the change in flow rate caused by a corresponding distance of movement of the graduated flow control bead 206 relative to the valve seat 204. In some embodiments, a movement of between 0 mm and 9 mm of the graduated flow control bead 206 relative to the associated valve seat 204 causes a change in flow rate between the minimum flow state of the valve and the maximum flow state of the valve. This is in comparison to a non-graduated flow transition (e.g. that provided by a planar bead that extends only in a plane normal to the longitudinal axis A) where a smaller movement of graduated flow control bead 206 relative to the associated valve seat 204 causes a similar change in flow rate e.g. a smaller relative movement may change the flow rate from the minimum flow state of the valve and the maximum flow state of the valve.

In the described embodiment, the graduated flow control bead 206 may extend along the length of the valve member (e.g. between X and Y in FIG. 4) a distance between 1 mm and 3 mm. This may provide a suitable graduated flow transition. In other embodiments this distance may be different to provide suitable flow transitions for other implementations of the flow control valve.

Figure 5A:
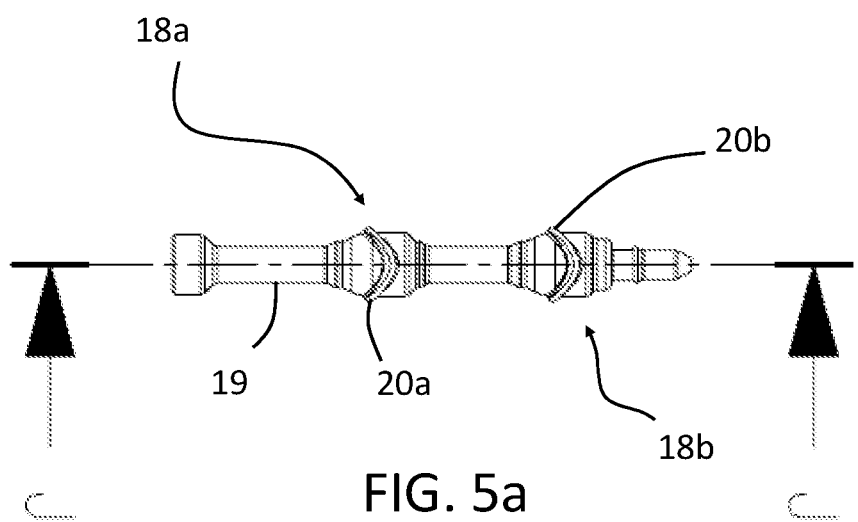
FIG. 5a shows a side view of part of a plumbing component according to an embodiment comprising two graduated flow control beads.
Figure 5B:
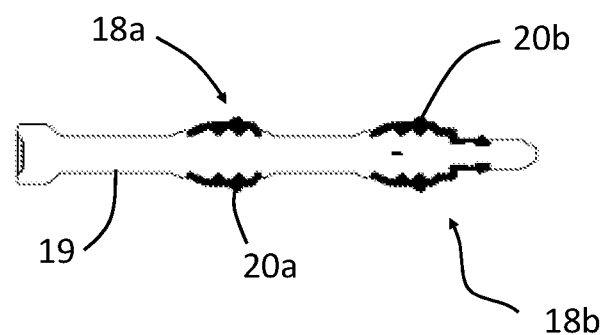

One embodiment of a graduated flow control bead is shown in more detail in FIGS. 5a and 5b. These Figures show a pair of valves members 18a, 18b integrally formed with a shaft 19 (corresponding reference numerals to those of FIG. 2 have been used). The valve seats and remainder of the plumbing component is not shown.

In this embodiment, the graduated flow control beads 20a, 20b are formed as part of a sleeve around an outside surface of each of the valves members 18a, 18b (e.g. an over molded sleeve). This can be seen more clearly in the cross section of FIG. 5b. In this embodiment, each of the graduated flow control beads 20a, 20b have a thickness (corresponding to "t" labelled in FIG. 4) of approximately 0.8 mm and extend along the length of the respective valve member a distance of approximately 2.8 mm (e.g. the distance between extents X and Y in FIG. 4). In this embodiment, the size of the aperture forming the valve seat is approximately 6 mm (e.g. the diameter in embodiments where it is circular). These dimensions may be suitable for a domestic implementation of the plumbing component. In other embodiments, these dimensions may be varied according to the desired flow rate through the plumbing component. These dimensions are therefore only one illustrative example.

Figure 6:
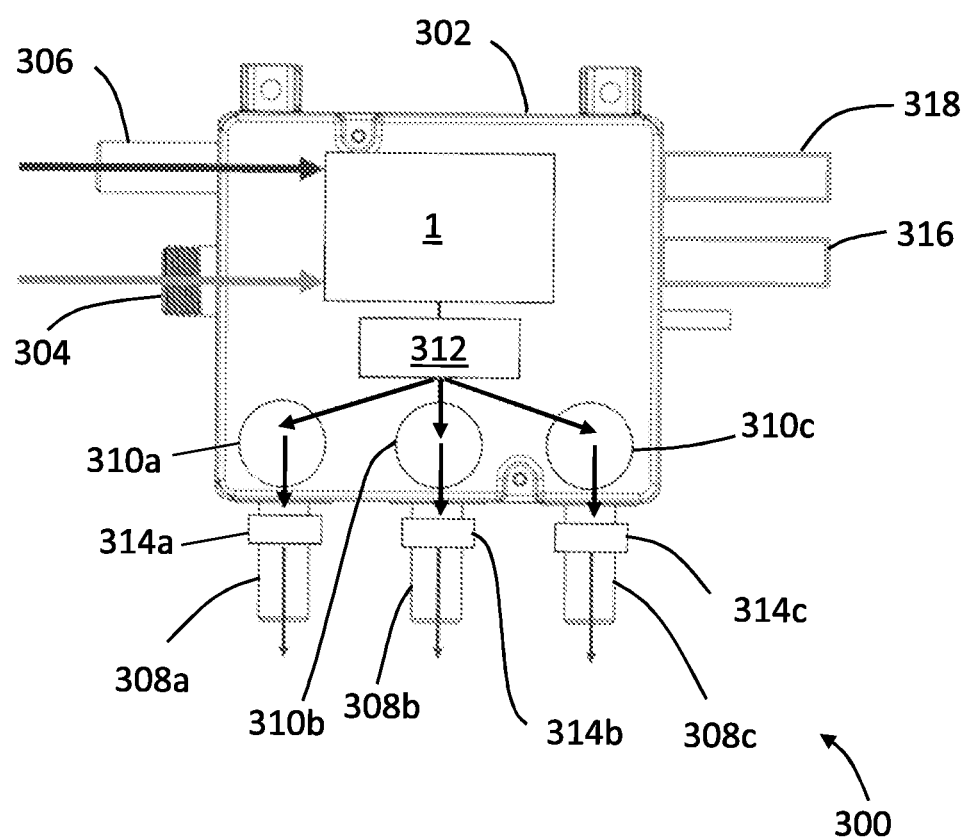
FIG. 6 shows a side view of a plumbing component according to an embodiment.

The mixer valve 1 shown in FIG. 1 and described above may be included in a plumbing component 300 as shown in the embodiment of FIG. 6.

The plumbing component 300 comprises a housing 302 that houses the flow shut-off mechanism and the first and second control valves and includes apertures 304 and 306 that form part of the cold water inlet and the hot water inlet. A further aperture is provided to form the outlet. The water inlets and outlet may be formed by channels formed within the housing which provide waterways along which water may flow.

In some embodiments, the housing of the plumbing component may be integral with the housing that forms the mixer valve 1. In other embodiments, the mixer valve 1 may be provided as a separate component having a separate housing that is housed within the housing 302 of the plumbing component 300. In such an embodiment, the housing of the mixer valve 1 may be coupled to the housing of the plumbing component so that water may flow between them as required.

In some embodiments, the housing of the plumbing component (and the housing of the mixer valve if separate) may be formed from a polymer material. In some embodiments this may be a filled polymer material, e.g. a glass filled polymer. In some embodiments, the housing may be formed or molded in two or more separate components which when connected together form the waterways through which the water may flow within the plumbing component. In such an embodiment, the surface of the housing may form the walls of the waterways. In yet other embodiments, the waterways formed within the housing may be lined. In other embodiments, the housing may be formed by any other suitable method or material as would be apparent to the skilled person.

By forming the plumbing component predominantly from a polymer material it may be efficiently and cost effectively manufactured. This may make the plumbing component more suitable for domestic use compared to, for example, a machined metal housing.

In some embodiments, each of the shafts on which the valve member(s) are mounted may be formed from a polymer material. Furthermore, the valve members may also be formed from a polymer material. This may further allow the plumbing component to be quickly and efficiently manufactured so domestic use. In other embodiments, these components may be formed from any other suitable material such as a metal.

In some embodiments, the plumbing component may comprise a disinfecting mechanism arranged to kill bacteria or microbes or the like that may be present in the waterways. In some embodiments the disinfecting mechanism may comprise a flush mechanism arranged to flush the waterways of the plumbing component with heated water. This use of such a flush mechanism may be suited to embodiments where the body of the plumbing component is predominantly made from a polymer material and so is not suitable for self-heating disinfectant methods.

In other embodiments, the body of the plumbing component may be formed from the metal material rather than a polymer material. In such an embodiment, the disinfecting mechanism may be formed by a heater arranged to heat the body to kill any bacteria that may be present. This embodiment may be more suited to commercial applications, and may be useful for implementation in hospitals, for example, where efficient disinfection is advantageous.

In the embodiment shown in FIG. 6, the fluid outlet 8 of the mixer valve 1 is fluidly coupled to a plurality of outlets 308 a, 308 b, 308 c. Three such outlets are shown in FIG. 6. However, the plurality of outlets may comprise any other suitable number of outlets according to the specific implementation of the plumbing component 300. In some embodiments, there may be between one and six separate outlets. Each of the plurality of outlets 308 a, 308 b, 308 c is fed by water from the first and second flow control valves and so each provide a supply of water having the same temperature. The plurality of outlets 308 a, 308 b, 308 c may provide separate water supplies for different parts of a plumbing fixture or assembly such as a tap or shower system. For example, a shower system having a plurality of shower heads may be supplied by the plurality of outlets 308 a, 308 b, 308 c, with each of the plurality of outlets coupled to each of the shower heads.

As previously described, the plumbing component 300 comprises a separate flow shut-off mechanism that is arranged to provide a non-graduated transition or less graduated transition between a closed and an open condition. In one embodiment, the flow shut-off mechanism may comprise an electronic shut-off mechanism. The electronic shut-off mechanism may be formed by a solenoid that is movable between a shut-off position in which the flow of water out of the outlet (or outlets) of the plumbing component 300 is restricted and an open position in which flow of water out of the outlet(s) is unrestricted.

In some embodiments, the flow shut-off mechanism may provide a sharp, non-graduated transition between the open and closed conditions. In other embodiments, a more graduated transition between the open and closed conditions may be provided. In such an embodiment, the graduated flow transition of the flow shut-off mechanism is less graduated than that provided by the graduated flow control bead. In some embodiments, the transition may be determined by the movement of the solenoid. The graduated flow transition may be determined by the armature position of the solenoid in a partially open state. For example, the solenoid may be a proportional solenoid arranged to provide one or more intermediate positions at which flow is limited between a fully open and a fully closed state.

The electronic shut-off mechanism may be provided at a point along a water flow path between each of the first and second flow control valves and an aperture forming the outlet (or outlets). This allows the flow of water to be shut-off downstream of the flow control valves (e.g. downstream of the mixer valve 1).

In some embodiments, a single flow shut-off mechanism (e.g. a single solenoid) may be provided to restrict flow from the outlet or plurality of outlets 308*a*, 308*b*, 308*c* of the plumbing component 300. In other embodiments, for example that shown in FIG. 6, a plurality of flow shut-off mechanisms 310*a*, 310*b*, 310*c* (e.g. a plurality of solenoids) may be provided to independently restrict flow from each, or one or more of, the plurality of outlets 310*a*, 310*b*, 310*c*.

In another embodiment, the flow shut-off mechanism may be formed by a flow shut-off bead forming part of each or some of the valve members of the flow control valves. An example of such an embodiment is shown in FIGS. 7*a* to 7*c*, 8*a* to 8*d* and FIGS. 9*a* and 9*b*.

Figures 7A, 7B:
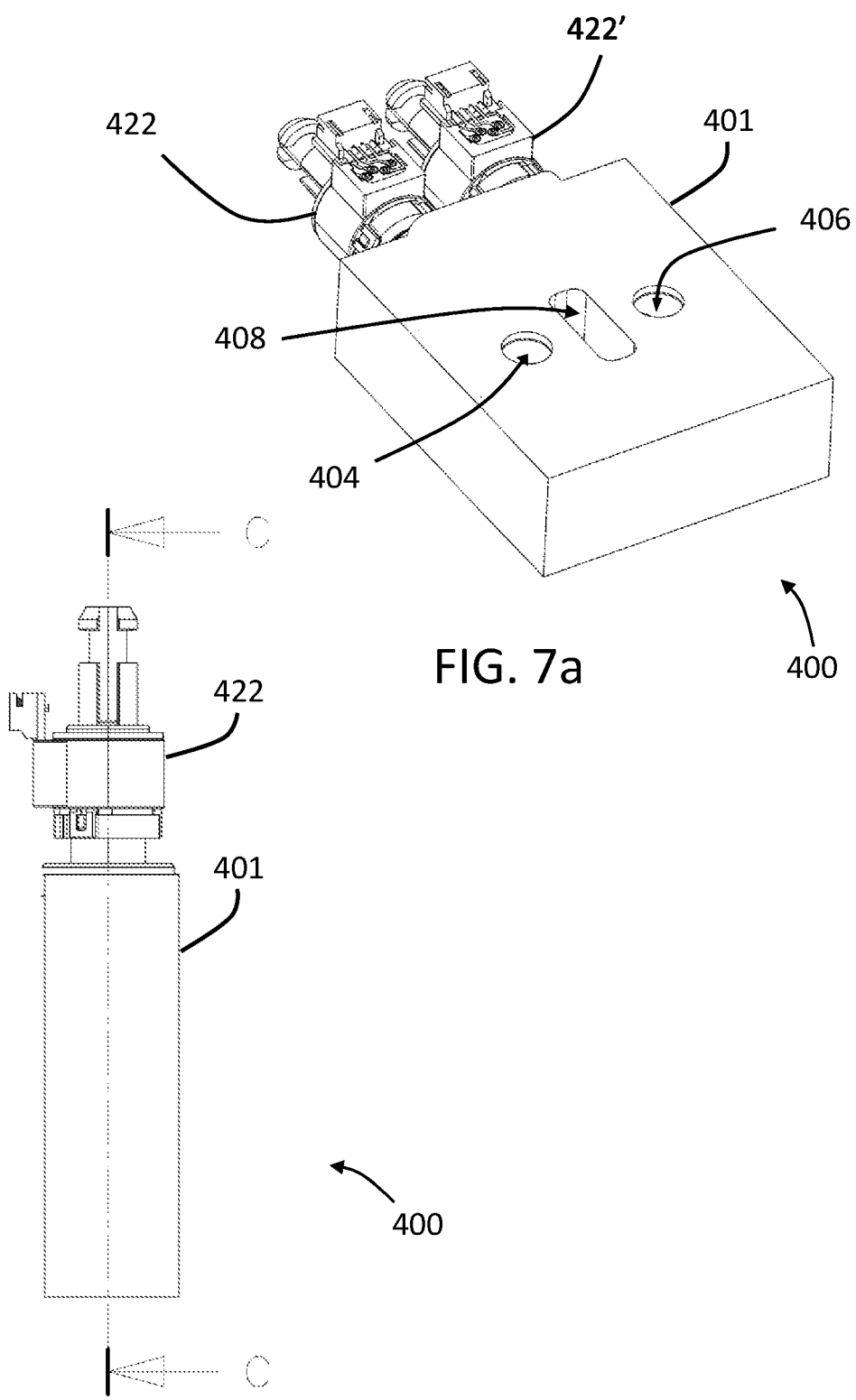
Figure 7C:
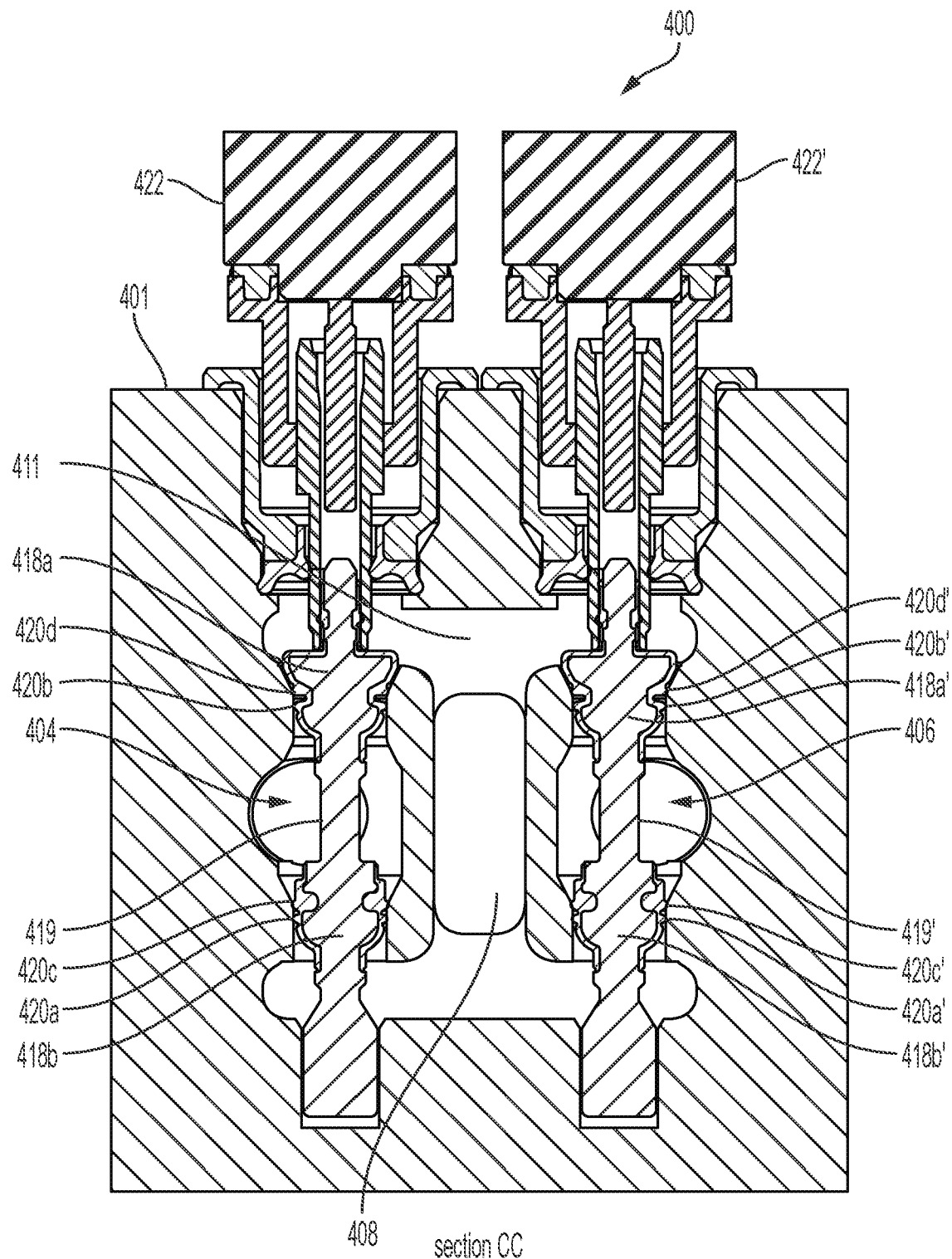
FIG. 7c shows a cross section through the mixer valve shown in FIG. 7b.
Figure 8A:
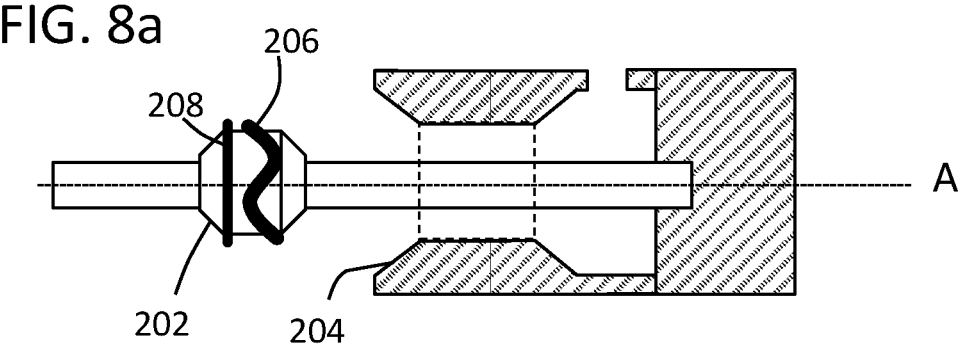
FIGS. 8a to 8d show a schematic view of a valve member and valve seat having a flow shut-off bead according to an embodiment.
Figure 8B:
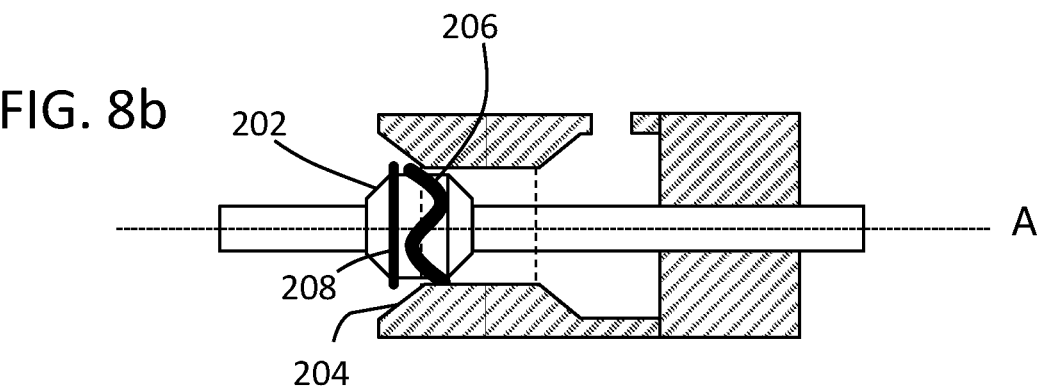
Figure 8C:
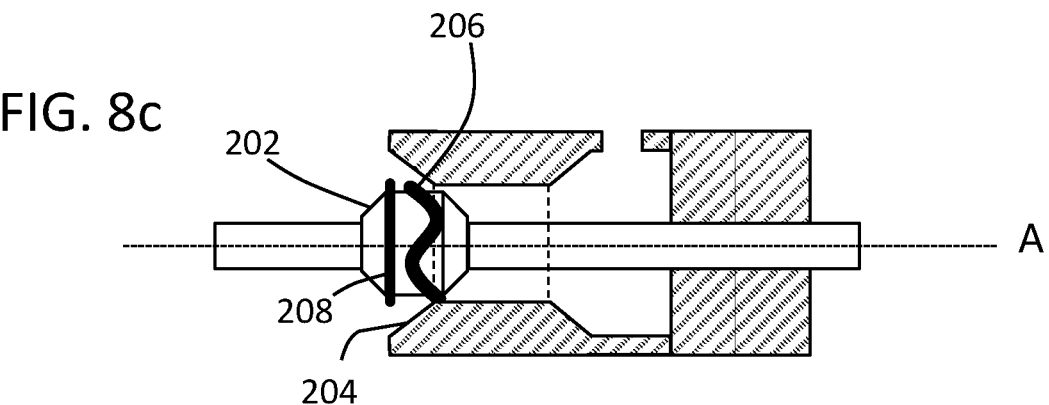
Figure 8D:
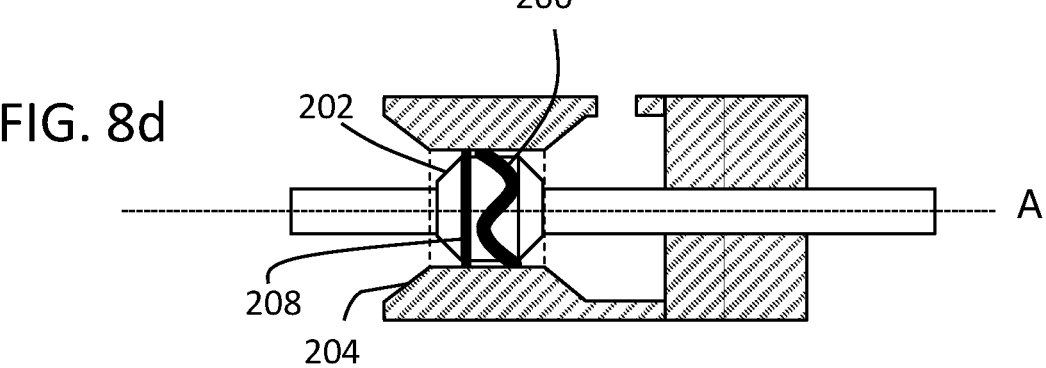

FIGS. 7*a* to 7*c* show views of a mixer valve 400, which can be used as part of a plumbing component according to another embodiment or the embodiment described above. Corresponding reference numerals to those of FIGS. 1 and 2 have been used for ease of reference. The mixing valve 400 comprises a housing 401 having an aperture forming the cold water inlet 404 and an aperture forming the hot water inlet 406. The housing 401 further comprises an aperture to form the outlet 408.

The housing 401 houses a first flow control valve and a second flow control valve having corresponding features to those shown in FIGS. 1 and 2. The first flow control valve is arranged to control the flow of cold water from the inlet 404 to the mixing chamber 411. The second flow control valve is arranged to control the flow of hot water from the inlet 406 to the mixing chamber 411. From the mixing chamber 411 water flows from the outlet 408 which may be connected to other parts of the plumbing component or may form the outlet of the plumbing component in which the mixer valve 400 is used.

The mixer valve 400 of FIGS. 7*a* to 7*c* differs from that shown in FIG. 1 by the layout of the inlet and outlet. In the embodiment of FIGS. 7*a* to 7*c* the direction of flow of water through the inlets 404, 406 and outlet 408 is generally parallel. This may allow the inlets and outlets to be provided on the same face of the mixer valve 400 housing 402 as can be seen in FIG. 7*a*. This is different to the embodiment of FIG. 1 where the flow of water through the inlets is in opposite directions to each other, with flow from the outlet being in a third perpendicular direction. In this embodiment, the inlets and outlet are all provided on different faces of the housing of the mixer valve to each other.

In the embodiment shown in FIG. 7*c*, the first flow control valve comprises a first valve member 418 *a* and a second valve member 418 *b* each mounted to a shaft 419. The valve members are arranged to seal against associated valve seats as described above. The shaft 419 is movable via an actuator 422. The second flow control valve corresponding comprises a first valve member 418 *a'* and second valve member 418 *b'* mounted to a shaft 419' moved by an actuator 422'.

In the embodiment shown in FIG. 7*c*, the valve members 418*a*, 418*b*, 418*a'*, 418*b'* each comprise both a graduated flow control bead 420*a*, 420*b*, 420*a'*, 420*b'* and a flow shut-off bead 420*c*, 420*d*, 420*c'*, 420*d'*. The graduated flow control beads 420*a*, 420*b*, 420*a'*, 420*b'* may be as described in relation to the embodiment of FIGS. 1 and 2.

In the embodiment of FIGS. 7*a* to 7*c*, each of the valve members may be provided with a flow shut off bead. In other embodiments, only some of the valve members may be provided with a flow shut of bead. In some embodiments, the flow shut off mechanism may be formed by one or both of an electronic shut of mechanism and one or more flow shut-off beads.

The operation and features of the flow shut off beads are shown in more detail in the sequence of FIGS. 8*a*-8*d*. These Figures show examples of the valve member 202 in the minimum seal, first partial seal, second partial seal and maximum seal positions of the graduated flow control bead 206 corresponding to those of FIGS. 3*a*-3*d*. Like reference numbers have been for ease of explanation. The flow shut-off bead 208 may be arranged to contact the valve seat 204 to provide a relatively less-graduated transition between an open and a closed state of each control valve compared to the graduated flow control bead.

The flow shut-off bead 420*c*, 420*d*, 420*c'*, 420*d'*, 208 may be a planar bead that extends only in a plane normal to the longitudinal axis, and is provided in addition to the graduated flow control bead 206. The flow shut-off bead 208 is arranged such that it provides a further sealing contact with the valve seat after the graduated flow control bead 206 has moved into the maximum seal position. In contrast to the graduated flow control bead 206, the flow shut-off bead 208 has a sealing surface the extent of which forms a simultaneous sealing contact with the valve seat. This provides a secure shut-off to each of the flow control valves.

In some embodiments, the flow shut-off bead 208 may be formed by an O-ring carried by the valve member 204. In other embodiments, the flow-shut off bead 208 may be formed by a protrusion on an outward facing surface of the valve member 204 or formed as part of a sleeve extending around the valve member 204. In other embodiments, the flow-shut off bead 208 may be any other suitable shape or configuration, apart from that shown in FIGS. 8*a*-8*d*, which provides a suitable flow shut-off.

Figure 9A:
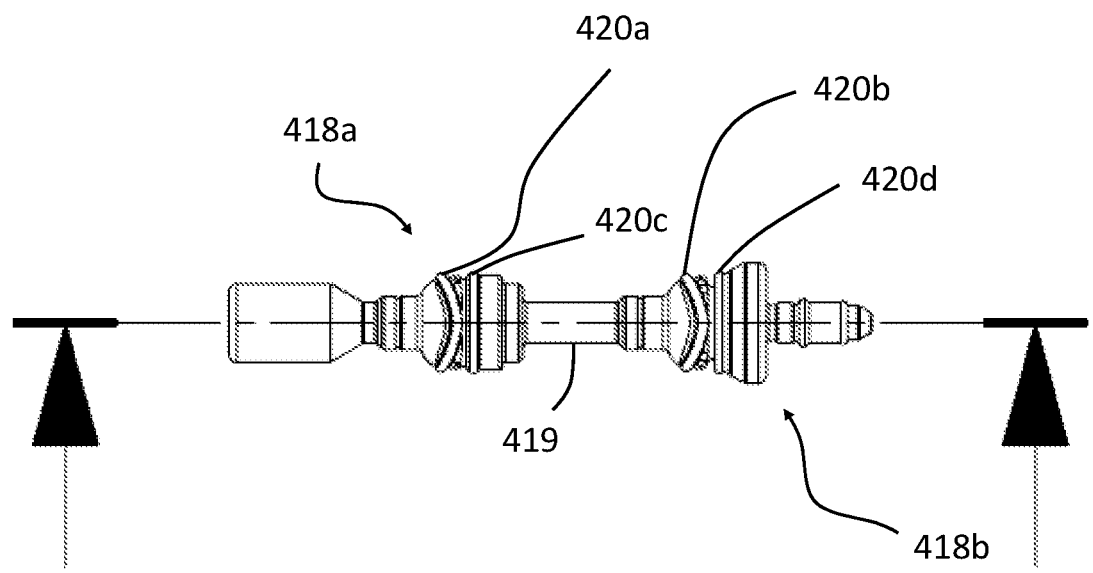
FIG. 9a shows a side view of part of a plumbing component according to an embodiment showing two graduated flow control beads and two flow shut-off beads.
Figure 9B:
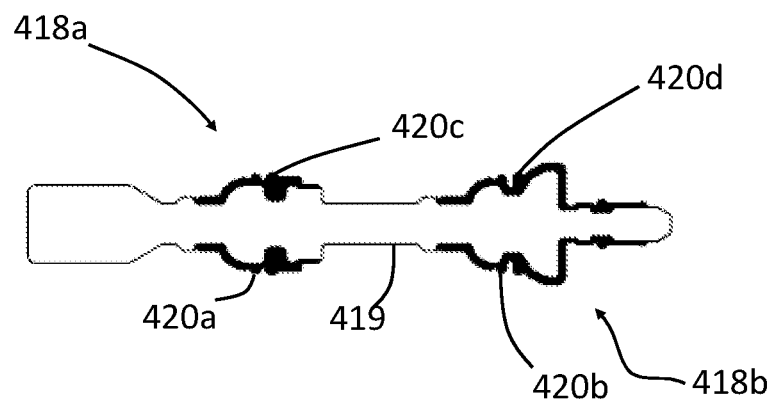

An embodiment of the flow shut-off bead is shown in more detail in FIGS. 9*a* and 9*b*. In these Figures the shaft 419 and valve members 418*a*, 418*b* of FIG. 7*c* are shown separately from the other components of the plumbing component.

In this embodiment, the graduated flow control bead 420*a*, 420*b* and the flow shut-off bead 420*c*, 420*d* are integrally formed as part of a sleeve extending around the respective valve member 418a, 418b. In this embodiment, the graduated flow control bead 420a, 420b has approximately the same thickness as the flow shut-off bead 420c, 420d. They may, for example, be each approximately 0.8 mm in thickness as described in connection with the embodiment of FIGS. 5a and 5b. These dimensions are however only one example and can be varied according to the specific implementation. For example, in some embodiments, the flow shut-off bead 420c, 420d may have a different thickness to the graduated flow control bead 420a, 420b. It may, for example, be thicker than the graduated flow control bead as shown by the second flow shut-off bead 420d associated with the second valve member 418b in FIGS. 9a and 9b. In this embodiment, the aperture formed by the valve seat may again be approximately 6 mm (e.g. the diameter in embodiments where it is circular).

In some embodiments, the plumbing component of any embodiment described herein may further comprise a controller (not shown in the Figures) configured to control any one or more of the first control valve, the second control valve or the flow shut-off mechanism in response to at least one of the water temperature or flow rate within the plumbing component.

Referring again to FIG. 6, the controller may be configured to receive temperature or flow rate information from a first sensor 312, the first sensor 312 being arranged to monitor at least one of the temperature or the flow rate of water flowing from the outlet or outlets 308a, 308b, 308c of the plumbing component 300. The sensor may be arranged to monitor the temperature and/or the flow rate of water flowing along a flow path through the plumbing component between each of the flow control valves and the outlet of outlets. For example, the sensor may provide a measurement of the temperature and/or the flow rate in the mixing chamber 11 in the embodiment of FIG. 2. In some embodiments, separate flow and temperature sensors may be provided. These separate sensors may be located together in a single housing or in some embodiments may be at suitable separate locations within the plumbing component.

In some embodiments, additional sensors may be included to provide an indication of the flow rate or temperature of the fluid at other positions within the plumbing component 300. In some embodiments, the controller may be configured to receive temperature or flow rate information from one or more second sensors (not shown in the Figures), the second sensor or sensors may be arranged to monitor at least one of the temperature or the flow rate of the water flowing through the hot and/or the cold inlets of the mixer valve 1. Other temperature and flow rate sensors may be provided and other suitable positions within the plumbing component 300 as necessary.

The controller may provide control signals to the mixer valve 1 and the mechanical shut-off mechanism (e.g. the solenoids 310a, 310b, 310c) for controlling the flow rate and temperature of the outlet water according to a user selection provided via an interface (not shown in the Figures). The interface may allow a user to select the flow rate and temperature they wish. The interface may comprise a touch sensitive panel for inputting settings and a display that shows the water temperature and flow rate. It will be appreciated that the interface can be of any suitable form for receiving user inputs for controlling the mixer valve and flow shut-off mechanism. It should also be understood that similar types of user interfaces may be employed either as part of, or adjacent to, other plumbing fixtures and fitting discussed herein (e.g., on or adjacent to a shower head or a stem thereof, on or adjacent to a tub spout, etc.).

In some embodiments, the inlets 304, 404, 306, 406 and the outlets 308a, 308b, 308c, 408 may be formed by interchangeable connectors, each adapted to connect to a different water supply system. An example of this is shown in FIG. 6. This may allow the connectors forming the inlet and outlets to be adapted to connect to different plumbing systems. The plumbing component can therefore be a modular part of a plumbing system that can be easily tailored for use in a particular system. The inlet and outlet connects shown in FIG. 6 are two examples only. The hot water inlet connector may be different from the cold water connector as shown in FIG. 6, or in other embodiments they may be the same as each other. The connectors shown in FIG. 6 are only examples, and other types of connector may be provided in other embodiments.

In some embodiments, the plumbing component may further comprise one or more flow regulators arranged to regulate the flow of water from the outlet (or outlets). For example, in the embodiment shown in FIG. 6a, each of the outlets 308a, 308b, 308c are provided with a corresponding flow regulator 314a, 314b, 314c. In other embodiments, the flow regulators may be absent.

The plumbing component of any of the described embodiments may further comprise a cold water outlet and a hot water outlet. For example, in the embodiment shown in FIG. 6, the plumbing component further comprises a cold water outlet 316 and a hot water outlet 318. In this embodiment, the cold water inlet 304 may be fluidly coupled to both an inlet of the first flow control valve 9 and the cold water outlet 316. Similarly, the hot water inlet 306 may be fluidly coupled to both an inlet of the second flow control valve 10 and the hot water outlet 318. The supply of hot water entering the plumbing component 300 via the hot water inlet 306 is therefore directed partly to the second flow control valve 10 and partly to the hot water outlet 318. Similarly, the supply of cold water entering the plumbing component 300 via the cold water inlet 304 is therefore directed partly to the first flow control valve 9 and partly to the cold water outlet 316.

The hot and cold water outlets 316, 318 are adapted to be connectable to the hot and cold water inlets of another plumbing component. This may allow a plurality of plumbing components to be conveniently stacked or cascaded together. For example, the cold water outlet of a first plumbing component may be fluidly coupled to the cold water inlet of a second plumbing component; and the hot water outlet of the first plumbing component may be fluidly coupled to the hot water inlet of the second plumbing component. This means that two or more plumbing components can be connected in series to the same supply of hot and cold water, rather than being connected in parallel. This may make installation easier and reduce the pipe work required to carry the water supply.

In such an embodiment, the first and second plumbing components may be controlled by a controller arranged to receive temperature and flow information from sensors in each plumbing component as described above. The controller may be arranged to control the flow control valves of the first and second plumbing components such that the temperature of water flowing from the outlet of the first plumbing component is different from that of the second plumbing component.

Figure 10A:
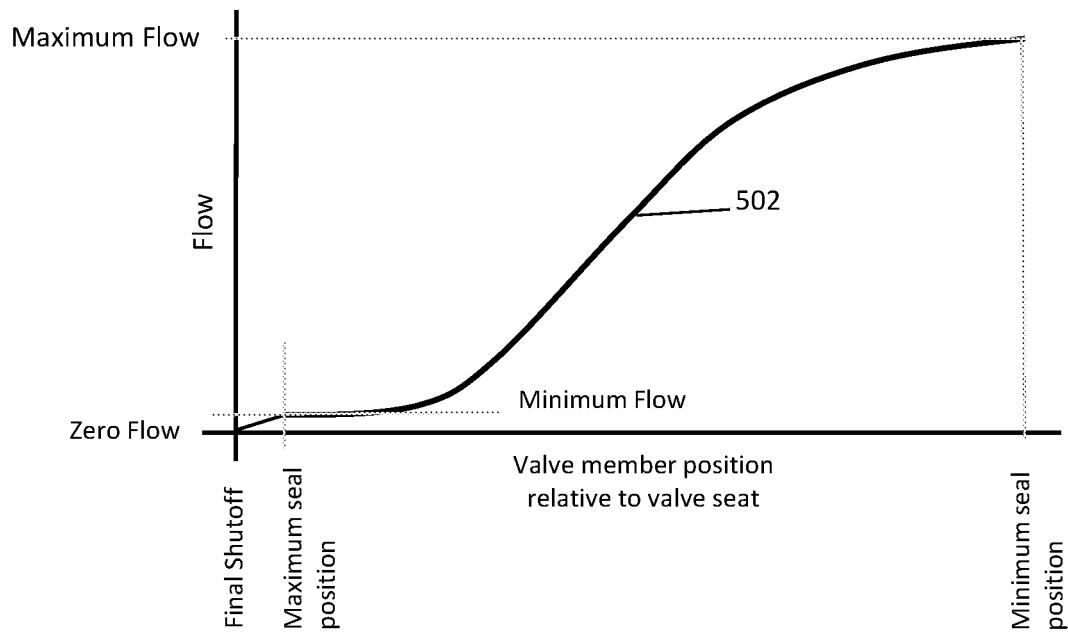
FIG. 10a shows a plot of the flow rate against relative valve member position for a plumbing component according to an embodiment.
Figure 10B:
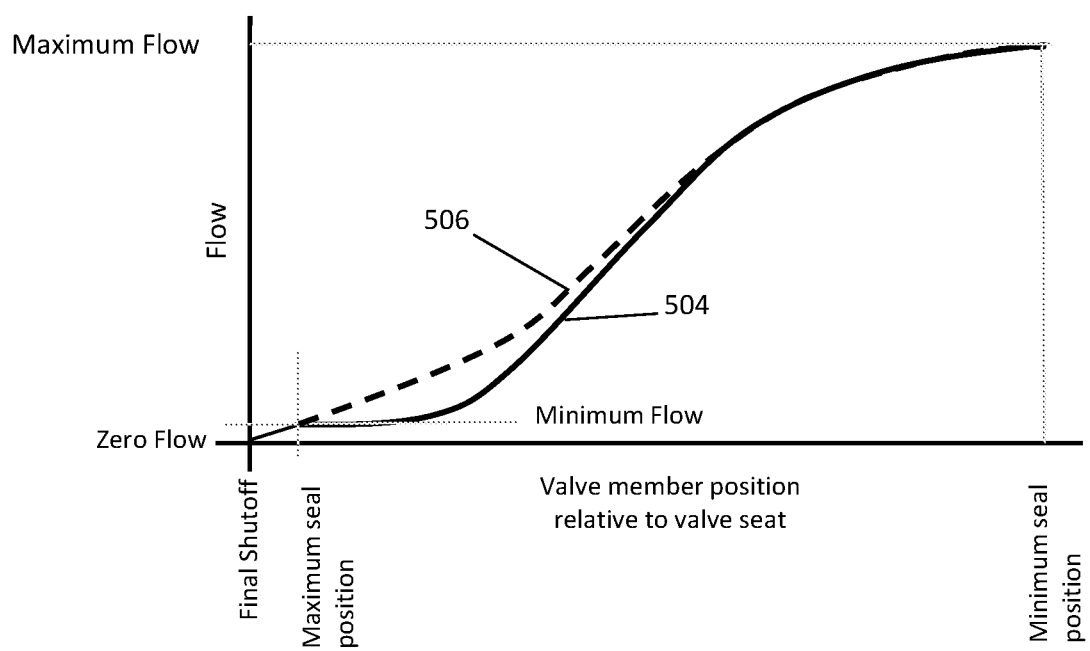
FIG. 10b shows a plot of the flow rate against relative valve member position for a plumbing component according to another embodiment.

In use the flow control valves and final shut-off mechanism of the plumbing component described herein may be used to adjust the flow rate and/or temperature of water leaving the outlet. FIGS. 10a and 10b show plots of the outlet flow as a function of the relative distance between the valve member and the valve seat.

FIG. 10*a* shows the resulting flow rate (line 502) for embodiments which include a graduated flow control bead and a flow-shut off mechanism formed by a solenoid. The flow rate in FIG. 10*a* may therefore be provided by a plumbing component according to the embodiment shown in FIGS. 5*a*, 5*b* and 6.

As can be seen in FIG. 10*a*, in the minimum seal position (e.g. FIG. 3*a*) of the valve member a maximum flow rate from the outlet is provided. As the relative distance between the valve member and the valve seat reduces the flow from the outlet reduces. A minimum flow level is provided when the valve member is in the maximum seal position (e.g. FIG. 3*d*). At this position there is some residual level of flow from the outlet. A zero flow rate is provided when the solenoid is in the shut-off position.

FIG. 10*b* shows an example of the outlet flow rate for embodiments which include a graduated flow control bead and a flow-shut off mechanism formed by a flow shut-off bead. FIG. 10*b* shows the rate of flow as a function of the movement of the valve member where the graduated flow control bead is provided (line 504) and a comparison with an embodiment where no graduated flow control bead is provided (line 506). In both cases the rate of flow varies from a maximum flow rate when the valve member is in a minimum seal position and a minimum flow rate when the valve member is in a maximum seal position. FIG. 10*b* shows that by providing a graduated flow control bead a greater graduation of flow is provided compared to that provided by only the flow shut-off bead. In other words, the reduction of flow caused by the graduated flow control bead is less in comparison to the reduction of flow caused by the flow-shut of bead for the same degree of relative movement between the valve member and valve seat. This may provide a finer resolution of adjustment of the flow rate, particularly at lower levels of flow.

The embodiments described above and shown in the Figures are to be understood as non-limiting examples only. Various modifications will be apparent to the skilled person. For example, the mixer valve 1 shown in FIG. 2 comprises two separate flow control valves each of which comprises two cooperating pairs of valve members and valve seats. In other embodiments, each flow control valve may comprise only a single pair of a cooperating valve member and a valve seat, or any other suitable number of valve members and valve seats (e.g. the second valve members 18*b* and 18*b*' and associated valve seats may be omitted or additional pairs may be included).

In the described embodiment, the graduated flow control bead is provided on each of the valve members of the first and second flow control valves. However, in some embodiments, not all of the valve members may be provided with a graduated flow control bead. For example, a graduated flow control bead may be provided to give a graduated flow transition for only one of the hot and cold water flow to the outlet.

The embodiments described above relate to mixer valves. However, the flow control valves 9, 10 could be used individually to control fluid flow. As an example, the flow control valve 9 shown in FIG. 2 could be employed separately from the flow control valve 10 in any application where it is desired to control the flow rate of a water supply.

In such an application, the mixing chamber 11 of the mixer valve 1 shown in FIG. 2 may be replaced with an outlet chamber which directs the flow from the outlets 14*a*, 14*b* of the flow control valve 9 to an outlet (not shown) for the intended application. The flow control valve 9 operates to control flow rate in similar manner to previous embodiments. In such an application the second flow control valve 10 is absent.

One application for such a flow control valve could be in an instantaneous water heater of the type in which a supply of water is heated as it passes through a heater tank to provide a source of hot water on demand. In such instantaneous water heaters (sometimes referred to as continuous flow water heaters), for a given power input to the heater tank, the temperature of the outlet water is determined by the flow rate of the water through the heater tank and control of flow rate may be used to achieve and maintain a selected outlet water temperature. One application for such water heaters is in an electric shower to supply water to one or more shower outlets such as a handset or fixed shower handset. Other applications of the flow control valve will be apparent to those skilled in the art.

Any of the embodiments described herein may be modified so that the hot water inlet and the cold water inlet are reversed. For example, the hot water inlet may be adapted to instead receive a supply of cold water and vice versa. In some embodiments, the hot and cold water inlets may be configurable by the user. In such an embodiment, a supply of either hot or cold water may be connected to each inlet as desired by the user and then the configuration of the plumbing component set by the user to match the connections made. In some embodiments, the water inlets may be configured to act as hold or cold water inlets via the controller. In this example, the configuration is performed by software run by the controller, rather than requiring any mechanical or physical change of the inlets themselves by the user.

In the embodiments previously described a graduated flow control bead is provided to give a graduated flow transition between a maximal and minimum flow rate. In other embodiments, the valve seat may be additionally or alternatively adapted to provide the graduated flow transition.

In some embodiments, the plumbing component may therefore comprise a graduated flow control mechanism that may be formed by the graduated flow control bead(s) and/or a graduated flow control portion(s) of the associated valve seat. In such an embodiment, the graduated flow control portion of the valve seat may comprise a tapered portion of the bore forming the valve seat (e.g. the sealing surface of the valve seat which contacts the valve member may be tapered). For example, the internal sealing surface (labelled 15 in FIG. 2) of the aperture which seals to the valve member may be shaped to provide a graduated flow transition. In other embodiments the flow control portion may comprise any other complex shape that may engage with the valve member to causes a graduated flow transition.

The graduated flow control mechanism may comprise one or more sealing surfaces which are arranged to seal against a corresponding sealing surface of the associated valve seat or valve member. The flow rate through the respective flow control valve may therefore be determined by the extent of the contact between the sealing surface or surfaces and the associated valve seat or valve member. The relative movement between the valve member and the valve seat may comprise movement between the a minimum seal position, a first partial seal position, a second partial seal position and a maximum seal position as described above. For example, the movement may be between any of the following positions: i) a minimum seal position in which there is no sealing contact between the, or each, sealing surface of the graduated flow control mechanism and the associated valve seat or valve member; ii) a first partial seal position in which part of the or each sealing surface of the graduated flow control mechanism is in sealing contact with the associated valve seat or valve member; iii) a second partial seal position in which part of the or each sealing surface of the graduated flow control mechanism is in sealing contact with the associated valve seat or valve member, wherein in the second partial seal position a greater extent of the sealing surface is in sealing contact with the associated valve seat or valve member in comparison to the first partial seal position; and iv) a maximum seal position in which a maximum extent of the or each sealing surface of the graduated flow control mechanism is in sealing contact with the associated valve seat or valve member. These positions correspond to those described in relation to FIGS. 3a-3d.

It will be appreciated that while the embodiments of the mixer valve and the flow control valve described herein are shown as being incorporated into plumbing fittings, they have wider application. The combination of graduated flow transition and/or separate flow shut-off may have advantageous uses in other implementations such as process control valves, pneumatic and hydraulic systems, medical equipment or in automotive components or other components where control of flow rate of a fluid and/or mixing of two fluids having different characteristics is required. Thus, the plumbing component may not be limited to mixing fluids having different temperatures and may be applied to other fluids apart from water. Either or both of the hot water inlet and cold water inlet may therefore be a described more broadly as fluid inlets configured to receive a supply of a fluid. In such embodiments, the plumbing component may be described more broadly as a valve or a mixer valve if mixing two or more fluids.

What is claimed is:

1. A plumbing component comprising:
   a water inlet configured to receive a supply of water;
   an outlet configured to output water received from the water inlet; and
   a flow control valve configured to control a flow of water from the water inlet to the outlet;
   wherein the flow control valve comprises a valve member and valve seat, wherein the valve member is movable with respect to the valve seat to control the flow of water through the flow control valve to the outlet; and
   wherein the valve member comprises a graduated flow control bead selectively sealing against the valve seat to provide a graduated flow transition between a maximum flow state and a minimum flow state of the flow control valve.

2. The plumbing component of claim 1, wherein the water inlet comprises a cold water inlet configured to receive a supply of cold water and a hot water inlet configured to receive a supply of hot water.

3. The plumbing component of claim 2, wherein the flow control valve comprises:
   a first flow control valve configured to control the flow of cold water from the cold water inlet to the outlet; and
   a second flow control valve configured to control the flow of hot water from the hot water inlet to the outlet.

4. The plumbing component of claim 1, wherein the graduated flow control bead comprises a sealing surface which is arranged to seal against a corresponding sealing surface of the valve seat, and wherein the flow rate through the flow control valve is determined by the extent of the contact between the sealing surface of the graduated flow control bead and the valve seat.

5. The plumbing component of claim 4, wherein the graduated flow control bead is arranged to move relative to the valve seat, and wherein the movement is between any of the following positions:
   i) a minimum seal position in which there is no sealing contact between the graduated flow control bead and the valve seat;
   ii) a first partial seal position in which part of the sealing surface of the graduated flow control bead is in sealing contact with the valve seat;
   iii) a second partial seal position in which part of the sealing surface of the graduated flow control bead is in sealing contact with the valve seat, wherein in the second partial seal position a greater extent of the sealing surface of the graduated flow control bead is in sealing contact with the valve seat in comparison to the first partial seal position; and
   iv) a maximum seal position in which a maximum extent of the sealing surface of the graduated flow control bead is in sealing contact with the valve seat.

6. The plumbing component of claim 1, wherein one or both of the shape and configuration of the graduated flow control bead compared to the shape and configuration of the valve seat provides the graduated flow transition.

7. The plumbing component of claim 1, wherein the valve member has a longitudinal axis, and wherein the longitudinal axis is arranged parallel to a first direction in which the graduated control bead is arranged to move relative to the valve seat.

8. The plumbing component of claim 7, wherein one or more of:
   a) the graduated flow control bead is a non-planar bead that extends only in a plane normal to the longitudinal axis;
   b) at least part of a sealing surface of the graduated flow control bead is shaped so that it is inclined relative to a plane normal to the longitudinal axis;
   c) the graduated flow control bead has a shape that extends between a first extent and a second extent along the length of the valve member, the distance between the first extent and the second extent being greater than a thickness of the graduated flow control bead; and
   d) the graduated flow control bead is shaped to follow a path having three or more turning points around the valve member.

9. The plumbing component of claim 1, wherein one or more of:
   a) a movement of between 0 mm and 9 mm of the graduated flow control bead relative to the valve seat causes a change in flow rate between the minimum flow state and the maximum flow state;
   b) a thickness of the graduated flow control bead is between 0.5 mm and 1.5 mm; and
   c) each valve member is mounted on a shaft and the graduated flow control bead comprises a sleeve around an outer surface of the valve member.

10. The plumbing component of claim 1, further comprising a flow shut-off mechanism configured to selectively restrict the flow of water from the outlet.

11. The plumbing component of claim 10, wherein the flow shut-off mechanism is formed by a flow shut-off bead forming part of the valve member, wherein the flow shut-off bead selectively contacts the valve seat to provide a transition between an open and a closed state of the flow control valve.

12. The plumbing component of claim 11, wherein the valve member has a longitudinal axis, and wherein the longitudinal axis is arranged parallel to a first direction in which the graduated control bead is arranged to move relative to the valve seat and, wherein the flow shut-off bead is a planar bead that extends only in a plane normal to the longitudinal axis.

13. The plumbing component of claim 10, wherein the flow shut-off mechanism comprises an electronic shut-off mechanism that is movable between a shut-off position in which the flow of water out of the outlet is restricted and an open position in which flow of water out of the outlet is unrestricted, and one or both of:
   a) the water flows through the plumbing component along a water flow path, and wherein the electronic shut-off mechanism is provided at a point along the water flow path between the flow control valve and an aperture forming the outlet; or
   b) the outlet is one of a plurality of outlets, each outlet being arranged to receive water from the flow control valve, and wherein the flow shut-off mechanism comprises a plurality of solenoids arranged to independently control the flow of water through each of the plurality of outlets.

14. A plumbing assembly comprising:
   a first plumbing component comprising:
      at least one water inlet configured to receive a supply of water;
      at least one outlet configured to output water received from the at least one water inlet; and
      a flow control valve configured to control a flow of water from the at least one water inlet to the at least one outlet;
      wherein the flow control valve comprises a valve member and valve seat, wherein the valve member is movable with respect to the valve seat to control the flow of water through the flow control valve to the at least one outlet; and
      wherein the valve member comprises a graduated flow control bead selectively sealing against the valve seat to provide a graduated flow transition between a maximum flow state and a minimum flow state of the flow control valve; and
   a second plumbing component;
   wherein the at least one outlet of the first plumbing component is coupled to at least one water inlet of the second plumbing component.

15. The plumbing assembly of claim 14, wherein:
   the at least one water inlet of the first plumbing component comprises a cold water inlet configured to receive a supply of cold water and a hot water inlet configured to receive a supply of hot water; and
   the at least one water inlet of the second plumbing component comprises a cold water inlet configured to receive a supply of cold water and a hot water inlet configured to receive a supply of hot water.

16. The plumbing assembly of claim 15, wherein:
   the at least one outlet of the first plumbing component comprises a cold water outlet and a hot water outlet;
   the cold water outlet of the first plumbing component is fluidly coupled to the cold water inlet of the second plumbing component; and
   the hot water outlet of the first plumbing component is fluidly coupled to the hot water inlet of the second plumbing component.

17. The plumbing assembly of claim 14, wherein the graduated flow control bead comprises a sealing surface which is arranged to seal against a corresponding sealing surface of the valve seat, and wherein the flow rate through the flow control valve is determined by the extent of the contact between the sealing surface of the graduated flow control bead and the valve seat.

18. The plumbing assembly of claim 14, wherein one or both of the shape and configuration of the graduated flow control bead compared to the shape and configuration of the valve seat provides the graduated flow transition.

19. A plumbing component comprising:
   a cold water inlet configured to receive a supply of cold water;
   a hot water inlet configured to receive a supply of hot water;
   an outlet configured to output water received from the cold water inlet and/or the hot water inlet;
   a flow control valve configured to control a flow of water from the cold water inlet and/or the hot water inlet to the outlet, wherein the flow control valve comprises a valve member and valve seat, wherein the valve member is movable with respect to the valve seat to control the flow of water through the flow control valve to the outlet, and wherein the valve member comprises a graduated flow control bead selectively sealing against the valve seat to provide a graduated flow transition between a maximum flow state and a minimum flow state of the control valve; and
   a flow shut-off mechanism operable to restrict the flow of water out of the outlet.

20. The plumbing component of claim 19, further comprising a controller configured to control the flow control valve and/or the flow shut-off mechanism in response to the water temperature, the water flow rate, or a combination thereof.

* * * * *